(12) United States Patent
Kwak et al.

(10) Patent No.: US 12,432,288 B2
(45) Date of Patent: Sep. 30, 2025

(54) ROLLABLE ELECTRONIC DEVICE INCLUDING ELASTIC MEMBER

(71) Applicant: Samsung Electronics Co., Ltd., Suwon-si (KR)

(72) Inventors: Myunghoon Kwak, Suwon-si (KR); Hyunggwang Kang, Suwon-si (KR); Joongyeon Cho, Suwon-si (KR); Yangwook Kim, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 17/946,580

(22) Filed: Sep. 16, 2022

(65) Prior Publication Data
US 2023/0164249 A1    May 25, 2023

Related U.S. Application Data

(63) Continuation of application No. PCT/KR2022/012958, filed on Aug. 30, 2022.

(30) Foreign Application Priority Data

Nov. 24, 2021 (KR) .................. 10-2021-0163060
Dec. 24, 2021 (KR) .................. 10-2021-0187218

(51) Int. Cl.
*H04M 1/02* (2006.01)

(52) U.S. Cl.
CPC ....... *H04M 1/0237* (2013.01); *H04M 1/0268* (2013.01); *H04M 2250/12* (2013.01)

(58) Field of Classification Search
CPC ............. H04M 1/0237; H04M 1/0268; H04M 2250/12; H04M 1/0241
See application file for complete search history.

(56) References Cited

U.S. PATENT DOCUMENTS

| | | | |
|---|---|---|---|
| 2014/0218375 A1 | 8/2014 | Kim | |
| 2015/0239499 A1* | 8/2015 | Lan | G01M 17/007 324/207.13 |

(Continued)

FOREIGN PATENT DOCUMENTS

| | | |
|---|---|---|
| CN | 110689811 | 1/2020 |
| JP | 2017-120264 | 7/2017 |

(Continued)

OTHER PUBLICATIONS

Search Report dated Nov. 25, 2022 in International Patent Application No. PCT/KR2022/012958.

(Continued)

*Primary Examiner* — Matthew D. Anderson
*Assistant Examiner* — Abdullah Al Mamun
(74) *Attorney, Agent, or Firm* — Nixon & Vanderhye, P.C.

(57) ABSTRACT

An electronic device may be provided. The electronic device may include a housing including a first housing and a second housing configured to receive at least a part of the first housing and guide a sliding movement of the first housing, a display configured to unfold based on the sliding movement of the first housing, an elastic member disposed in the housing and configured to be compressed based on the sliding movement of the first housing, a sensor module disposed in the housing and configured to sense a pressure provided by the elastic member, and a processor configured to determine a sliding distance of the electronic device, based on the pressure sensed by the sensor module.

19 Claims, 14 Drawing Sheets

(56) References Cited

U.S. PATENT DOCUMENTS

| | | |
|---|---|---|
| 2017/0190359 A1 | 7/2017 | Hong |
| 2017/0357287 A1 | 12/2017 | Yang |
| 2020/0170128 A1 | 5/2020 | Kim |
| 2021/0181800 A1* | 6/2021 | Ko .................... G06F 1/1637 |
| 2021/0216108 A1 | 7/2021 | Lee et al. |
| 2021/0278878 A1 | 9/2021 | Shim et al. |
| 2022/0036860 A1 | 2/2022 | Kang et al. |
| 2022/0311846 A1* | 9/2022 | Kwak ................ G06F 1/1624 |

FOREIGN PATENT DOCUMENTS

| | | |
|---|---|---|
| KR | 10-1999-0024092 | 3/1999 |
| KR | 20-0390786 | 7/2005 |
| KR | 10-2007-0097007 | 10/2007 |
| KR | 10-2014-0100149 | 8/2014 |
| KR | 10-2017-0051203 | 5/2017 |
| KR | 10-2017-0094347 | 8/2017 |
| KR | 10-2018-0112316 | 10/2018 |
| KR | 10-2020-0061275 | 6/2020 |
| KR | 10-2021-0076492 | 6/2021 |
| KR | 10-2289274 | 8/2021 |
| WO | 2021/141160 | 7/2021 |
| WO | 2021-177482 | 9/2021 |

OTHER PUBLICATIONS

Written Opinion dated Nov. 25, 2022 in International Patent Application No. PCT/KR2022/012958.

* cited by examiner

ROLLABLE ELECTRONIC DEVICE INCLUDING ELASTIC MEMBER

CROSS-REFERENCE TO RELATED APPLICATIONS

This application is a continuation of International Application No. PCT/KR2022/012958 designating the United States, filed on Aug. 30, 2022, in the Korean Intellectual Property Receiving Office and claiming priority to Korean Patent Application No. 10-2021-0163060, filed on Nov. 24, 2021, in the Korean Intellectual Property Office, and to Korean Patent Application No. 10-2021-0187218, filed on Dec. 24, 2021, in the Korean Intellectual Property Office, the disclosures of all of which are incorporated by reference herein in their entireties.

BACKGROUND

Field

The disclosure is related to a rollable electronic device including an elastic member.

Description of Related Art

In line with development of information/communication technologies and semiconductor technologies, various functions tend to be integrated in a single portable electronic device. For example, electronic devices may implement not only a communication function, but also an entertainment function (for example, gaming), a multimedia function (for example, music/video playback), communication and security functions for mobile banking and the like, a scheduling function, and an electronic wallet function. Such electronic devices have become compact such that users can conveniently carry the same.

Mobile communication services have been expanded to multimedia services, making it desirable to increase the display size of electronic devices such that users can sufficiently use multimedia services in addition to voice communication or short messages. However, there is a trade-off between the display size of electronic devices and the compactness of electronic devices.

SUMMARY

According to an embodiment of the disclosure, an electronic device may include a housing including a first housing and a second housing configured to receive at least a part of the first housing and guide a sliding movement of the first housing, a display configured to unfold based on the sliding movement of the first housing, an elastic member disposed in the housing and configured to be compressed based on the sliding movement of the first housing, a sensor module disposed in the housing and configured to sense a pressure provided by the elastic member, and a processor configured to determine a sliding distance of the first housing, based on the pressure sensed by the sensor module.

According to an embodiment of the disclosure, an electronic device may include a housing including a first housing and a second housing configured to receive at least a part of the first housing and guide a sliding movement of the first housing, a display configured to unfold based on the sliding movement of the first housing, a first elastic member connected to the second housing and configured to increase compressive strength when the first housing slidingly moves in a second direction, a second elastic member connected to the second housing and configured to increase compressive strength when the first housing moves in a first direction opposite to the second direction, a first sensor module configured to sense a first pressure provided by the first elastic member, a second sensor module configured to sense a second pressure provided by the second elastic member, and a processor configured to determine a sliding distance of the first housing, based on the first pressure or the second pressure.

According to an embodiment of the disclosure, an operation method of a rollable electronic device may include sensing a pressure provided by an elastic member configured to be compressed based on a sliding movement of the electronic device by using a sensor module, determining a sliding distance of the electronic device, based on the pressure, and adjusting a size of an image output from a display, based on the sliding distance.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
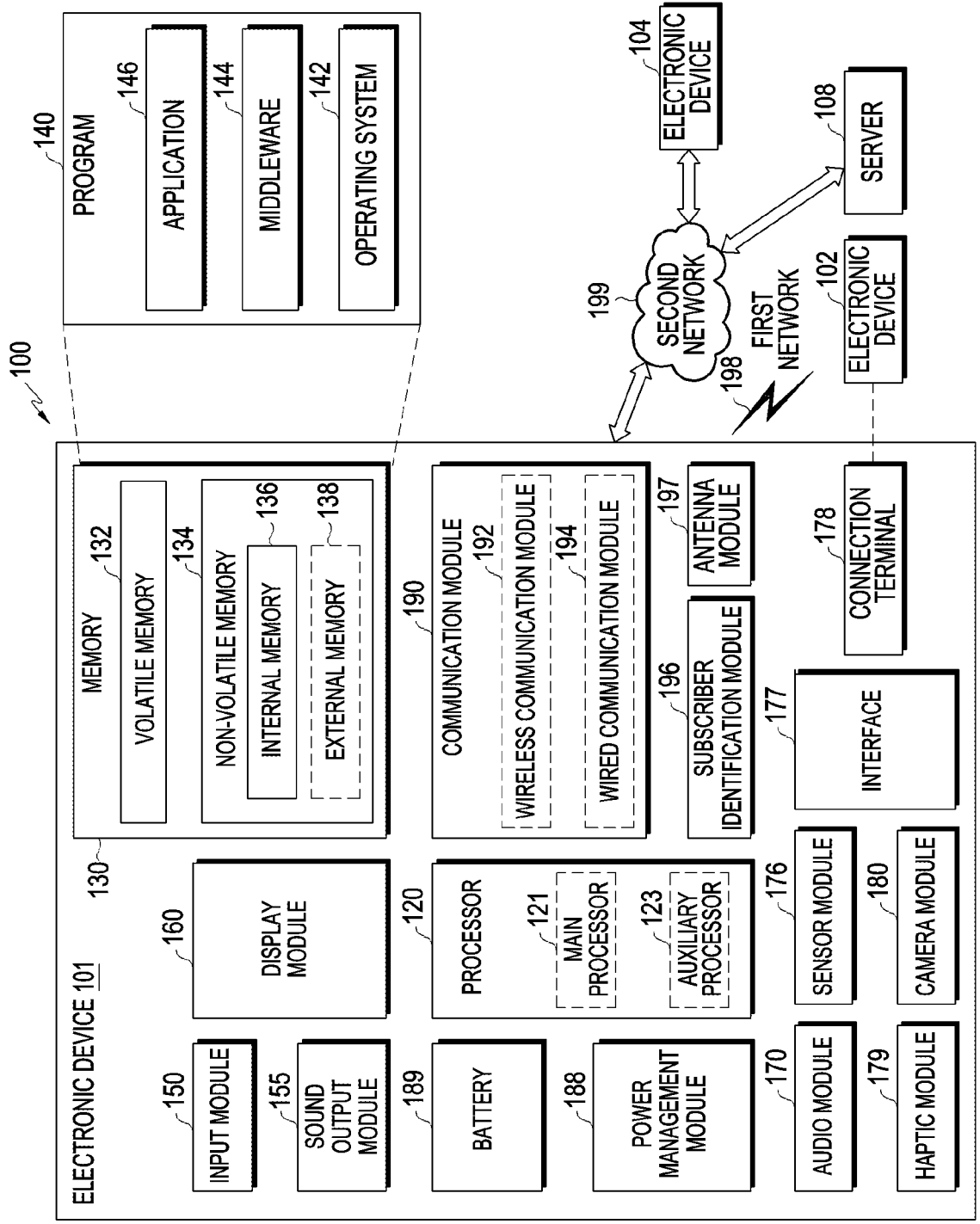
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
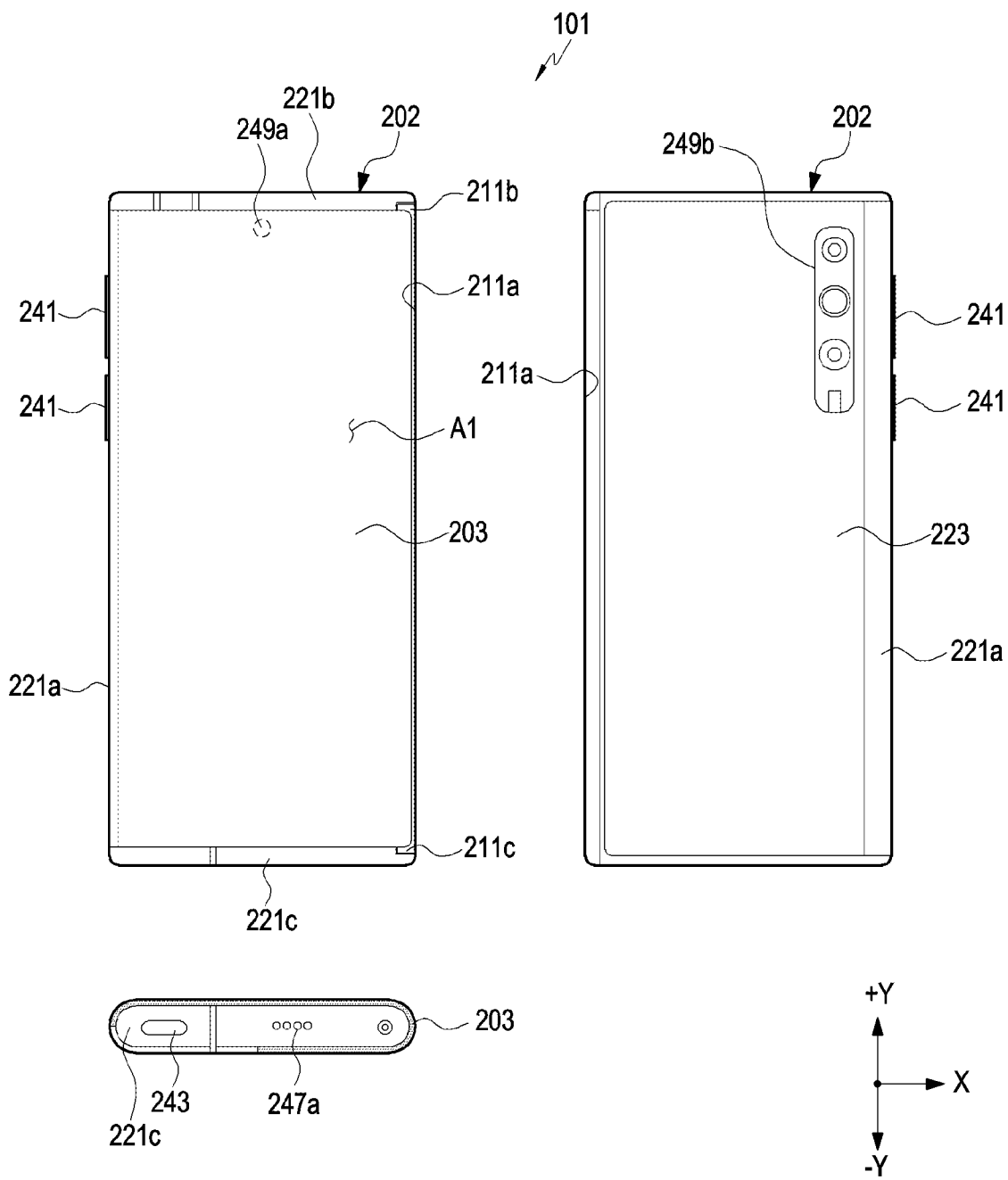
FIG. 2 is a view of an electronic device in a closed state, according to an embodiment of the disclosure.
Figure 3:
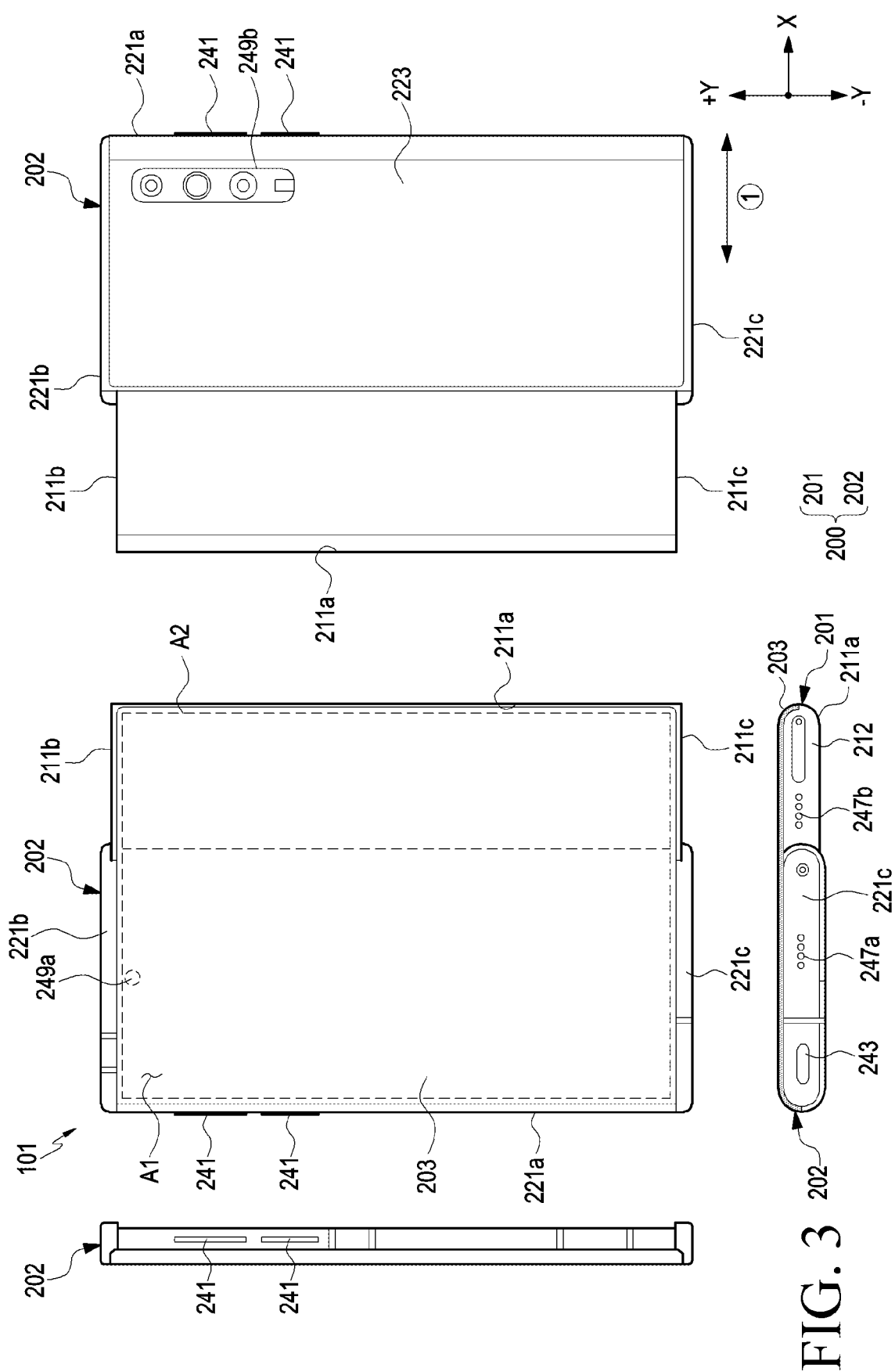
FIG. 3 is a view of an electronic device in an opened state, according to an embodiment of the disclosure.

FIG. 2 is a view of an electronic device in a closed state, according to an embodiment of the disclosure. FIG. 3 is a view of an electronic device in an opened state, according to an embodiment of the disclosure. For example, FIG. 2 is a view illustrating a state in which a second display area A2 is received in a housing 202. FIG. 3 is a view illustrating a state in which at least a part of the second display area A2 is visually exposed to the outside of the housing 202.

The state shown in FIG. 2 may refer, for example, to a first housing 201 being closed with respect to a second housing 202, and the state shown in FIG. 3 may refer, for example, to the first housing 201 being opened with respect to the second housing 202. According to an embodiment, a "closed state" or an "opened state" may be defined as a state in which an electronic device is closed or opened.

Referring to FIGS. 2 and 3, an electronic device 101 may include a housing 200. The housing 200 may include the second housing 202 and the first housing 201, which can move with respect to the second housing 202. In an embodiment, it may be interpreted as a structure in which the second housing 202 is slidably disposed on the first housing 201 in the electronic device 101. According to an embodiment, the first housing 201 may be disposed to be able to reciprocate by a predetermined distance in a direction shown with reference to the second housing 202, for example, a direction indicated by an arrow 1. The configuration of the electronic device 101 of FIGS. 2 and 3 may be all or partly the same as the configuration of the electronic device 101 of FIG. 1.

According to an embodiment, the first housing 201 may be referred to as, for example, a first structure, a slide part, or a slide housing, and may be disposed to be able to reciprocate with respect to the second housing 202. According to an embodiment, the second housing 202 may be referred to as, for example, a second structure, a main part, or a main housing. The second housing 202 may receive at least a part of the first housing 201 and guide a sliding movement of the first housing 201. According to an embodiment, the second housing 202 may receive various electrical and electronic components such as a main circuit board or a battery. According to an embodiment, at least a part (e.g., a first display area A1) of a display 203 may be visually exposed to the outside of the housing 200. According to an embodiment, as the first housing 201 moves (e.g., slides) with respect to the second housing 202, another part (e.g., a second display area A2) of the display 203 may be received (e.g., a slide-in operation) in the inside of the second housing 202, or may be visually exposed (e.g., a slide-out operation) to the outside of the second housing 202. According to an embodiment, a motor, a speaker, a SIM socket, and/or a sub-circuit board electrically connected to a main circuit board may be disposed in the first housing 201. The main circuit board on which electrical components such as an application processor (AP) and a communication processor (CP) are mounted may be disposed in the second housing 202.

Figure 4:
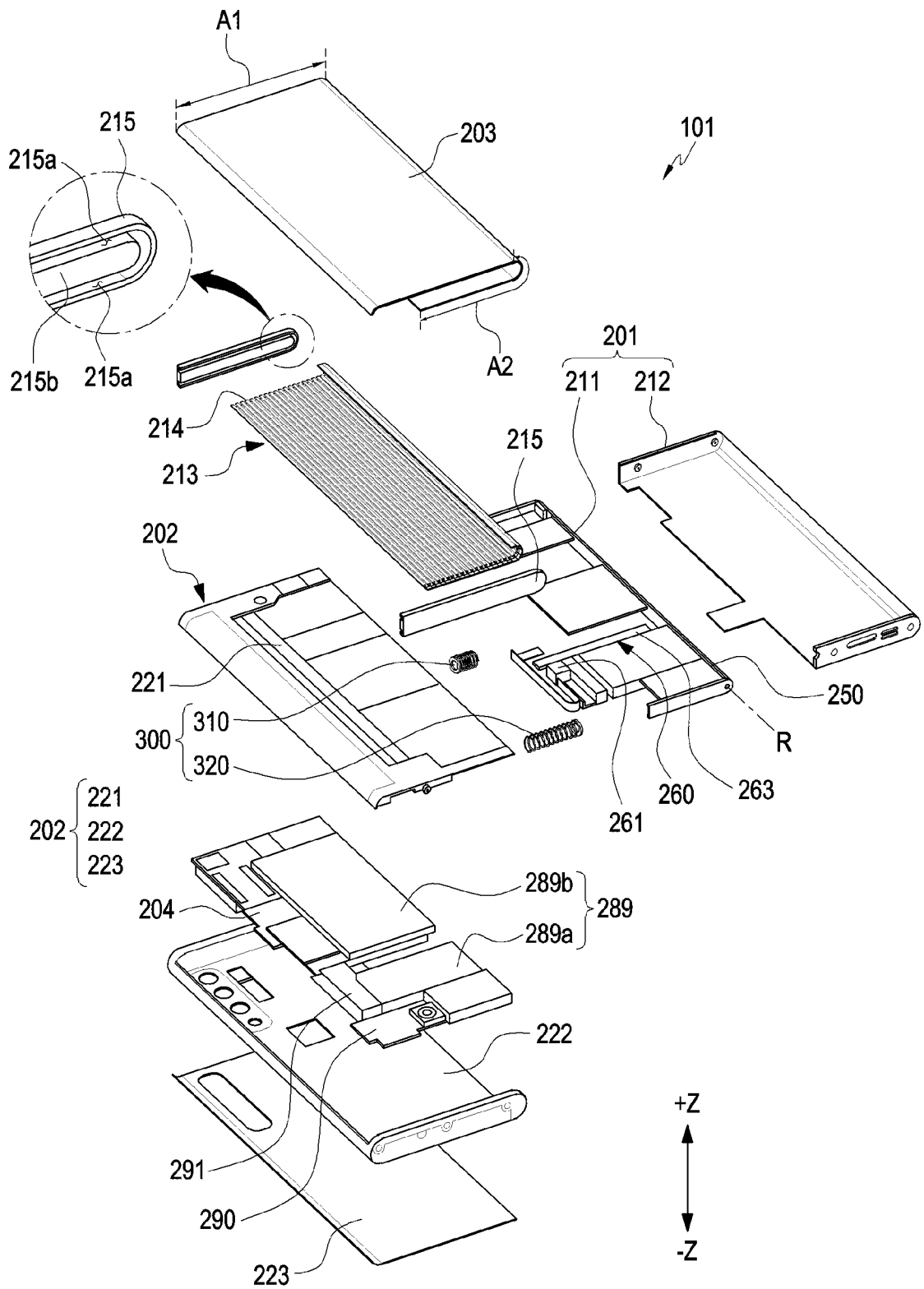
FIG. 4 is an exploded perspective view of an electronic device, according to an embodiment of the disclosure.

According to an embodiment, the first housing 201 may include first sidewalls 211a, 211b, and 211c for surrounding at least a part of the display 203 and/or a multi-bar structure (e.g., a multi-bar structure 213 of FIG. 4). According to an embodiment, the first sidewalls 211a, 211b, and 211c may extend from a first plate (e.g., a first plate 211 of FIG. 4). The first sidewalls 211a, 211b, and 211c may include a 2nd first ((1-2)th) sidewall 211b, a 3rd first ((1-3)th) sidewall 211c opposite to the (1-2)th sidewall 211b, and a (1-1)th sidewall 211a extending from the (1-2)th sidewall 211b up to the (1-3)th sidewall 211c. For example, the (1-2)th sidewall 211b may be positioned in an upper part (e.g., the +Y direction) of the electronic device 101, and the (1-3)th sidewall 211c may be positioned in a lower part (e.g., the −Y direction) of the electronic device 101. According to an embodiment, the (1-1)th sidewall 211a may be substantially perpendicular to the (1-2)th sidewall 211b and/or the (1-3)th sidewall 211c. According to an embodiment, in a state in which the electronic device 101 is closed (e.g., FIG. 2), the (1-2)th sidewall 211b may face a (2-2)th sidewall 221b of the second housing 202, and the (1-3)th sidewall 211c may face a (2-3)th sidewall 221c of the second housing 202. According to an embodiment, the (1-1)th sidewall 211a, the (1-2)th sidewall 211b, and/or the (1-3)th sidewall 211c may be integrally configured with the first plate (e.g., the first plate 211 of FIG. 4) or a slide cover 212. According to another embodiment, the (1-1)th sidewall 211a, the (1-2)th sidewall 211b, and/or the (1-3)th sidewall 211c may be configured as separate housings and thus coupled or assembled.

According to an embodiment, the second housing 202 may include second sidewalls 221a, 221b, and 221c for surrounding at least a part of the first housing 201. According to an embodiment, the second sidewalls 221a, 221b, and 221c may extend from a second plate (e.g., a second plate 221 of FIG. 4) and/or a cover member (e.g., a cover member 222 of FIG. 4). According to an embodiment, the second sidewalls 221a, 221b, and 221c may include the (2-2)th sidewall 221b, the (2-3)th sidewall 221c opposite to the (2-2)th sidewall 221b, and a (2-1)th sidewall 221a extending from the (2-2)th sidewall 221b up to the (2-3)th sidewall 221c. For example, the (2-2)th sidewall 221b may be positioned in the upper part (e.g., the +Y direction) of the electronic device 101, and the (2-3)th sidewall 221c may be positioned in the lower part (e.g., the −Y direction) of the electronic device 101. According to an embodiment, the (2-1)th sidewall 221a may be substantially perpendicular to the (2-2)th sidewall 221b and/or the (2-3)th sidewall 221c. According to an embodiment, the (2-2)th sidewall 221b may face the (1-2)th sidewall 211b, and the (2-3)th sidewall 221c may face the (1-3)th sidewall 211c. For example, in a state in which the electronic device 101 is closed (e.g., FIG. 2), the (2-2)th sidewall 221b may cover at least a part of the (1-2)th sidewall 211b, and the (2-3)th sidewall 221c may cover at least a part of the (1-3)th sidewall 211c.

According to an embodiment, the second housing 202 may be configured in a shape in which one side (e.g., a front face) is opened to receive (or surround) at least a part of the first housing 201. For example, the first housing 201 may be connected to the second housing 202 in a state of being at least partially covered by the (2-1)th sidewall 221a, the (2-2)th sidewall 221b, and the (2-3)th sidewall 221c, and may slidingly move in a direction of the arrow 1 while being guided by the second housing 202. According to an embodiment, the cover member (e.g., the cover member 222 of FIG. 4), the (2-1)th sidewall 221a, the (2-2)th sidewall 221b, and/or the (2-3)th sidewall 221c may be integrally configured. According to another embodiment, the cover member 222, the (2-1)th sidewall 221a, the (2-2)th sidewall 221b, and/or the (2-3)th sidewall 221c may be configured as separate housings and thus coupled or assembled.

According to an embodiment, the second housing 202 may include a back plate 223. According to an embodiment, the back plate 223 may configure at least a part of the external appearance of the electronic device 101. For example, the back plate 223 may provide a decorative effect on the external appearance of the electronic device 101.

According to an embodiment, the cover member 222 and/or the (2-1)th sidewall 221a may cover at least a part of the display 203. For example, at least a part (e.g., the second display area A2) of the display 203 may be received in the second housing 202, and the cover member 222 and/or the (2-1)th sidewall 221a may cover a part of the display 203 having been received in the second housing 202.

According to an embodiment, the electronic device 101 may include the display 203. For example, the display 203 may be a flexible display or a rollable display. According to an embodiment, at least a part (e.g., the second display area A2) of the display 203 may slidingly move, based on a sliding movement of the first housing 201. According to an embodiment, the display 203 may include or be disposed adjacent to a touch sensing circuit, a pressure sensor capable of measuring the intensity (pressure) of a touch, and/or a digitizer configured to detect a magnetic field-type stylus pen. The configuration of the display 203 of FIGS. 2 and 3 may be all or partly the same as the configuration of the display module 160 of FIG. 1.

According to an embodiment, the display 203 may include the first display area A1 and the second display area A2. According to an embodiment, the first display area A1 may be an area which is always visible from the outside. According to an embodiment, the first display area A1 may be an area which may not be positioned inside the housing 202. According to an embodiment, the second display area A2 may extend from the first display area A1, and be inserted or received into the second housing 202 according to a sliding movement of the first housing 201, or be visually exposed to the outside of the second housing 202. According to an embodiment, the first display area A1 may be stably seated on a part (e.g., the first plate 211) of the first housing 201.

According to an embodiment, the second display area A2 may move while being substantially guided by a multi-bar structure (e.g., the multi-bar structure 213 of FIG. 4) mounted in the first housing 201, and be thus received inside the second housing 202 or in a space formed between the first housing 201 and the second housing 202, or may be visually exposed to the outside. According to an embodiment, the second display area A2 may move based on a sliding movement in a width direction (e.g., a direction indicated by the arrow ①) of the first housing 201. For example, at least a part of the second display area A2 may be unfolded or rolled together with the multi-bar structure 213, based on the sliding movement of the first housing 201.

According to an embodiment, when viewed from the top of the first housing 201, if the first housing 201 moves from a closed state to an opened state, the second display area A2 may be gradually exposed to the outside of the housing 202 to form a substantially flat surface together with the first display area A1. In an embodiment, the second display area A2 may be at least partially received in the first housing 201 and/or the second housing 202.

According to an embodiment, the electronic device 101 may include at least one key input device 241, a connector hole 243, audio modules 247a and 247b, or camera modules 249a and 249b. Although not shown, the electronic device 101 may further include an indicator (e.g., an LED device) or various sensor modules. The configuration of the audio module 247a and 247b and the camera modules 249a and 249b of FIGS. 2 and 3 may be all or partly the same as the configuration of the audio module 170 and the camera module 180 of FIG. 1.

According to an embodiment, the key input device 241 may be positioned in one area of the second housing 202. According to an external appearance and a use state, the electronic device 101 may be designed such that the illustrated key input device 241 is omitted or additional key input device(s) are included. According to an embodiment, the electronic device 101 may include a key input device not shown, for example, a home key button, or a touch pad disposed around the home key button. According to an embodiment (not shown), at least a part of the key input device 241 may be disposed on the second housing 202.

According to an embodiment, the key input device 241 may be used as a driving structure for automatically or semi-automatically providing a slide-in-out operation of the display 203. For example, when a user presses an open trigger button (e.g., the key input device 241 of FIG. 2) exposed to the outside of the electronic device 101, the display 203 may automatically slide in or slide out (automatic operation). For another example, when a user moves the display 203 of the electronic device 101 up to a specified section and slides the same out, the remaining section may be completely slid out by the force of an elastic member (e.g., an elastic member 300 of FIG. 5) mounted in the electronic device 101 (semi-automatic operation). For example, a state of the electronic device 101 may be changed from a closed state (e.g., FIG. 2) to an opened state (e.g., FIG. 3) by being slid out. A slide-in operation of the electronic device 101 may also be performed to correspond to the slide-out operation.

According to an embodiment, the connector hole 243 (which may be omitted according to an embodiment) may receive a connector (e.g., a USB connector) for transmitting or receiving power and/or data to or from an external electronic device. Although not shown, the electronic device 101 may include a plurality of connector holes 243, and one or more of the plurality of connector holes 243 may function as a connector hole for transmitting or receiving an audio signal to or from an external electronic device. In the illustrated embodiment, the connector holes 243 are disposed in the (2-3)th sidewall 221c, but the disclosure is not limited thereto, the connector holes 243 or a connector hole not shown may be disposed on the (2-1)th sidewall 221a or the (2-2)th sidewall 221b.

According to an embodiment, the audio modules 247a and 247b may include at least one speaker hole 247a and 247b and/or at least one microphone hole. At least one of the speaker holes 247a and 247b may be provided as an external speaker hole. At least one of the speaker holes 247a and 247b may be provided as a receiver hole for a voice call. The electronic device 101 may include a microphone for acquiring sound, and the microphone may acquire external sound of the electronic device 101 through the microphone hole. According to an embodiment, the electronic device 101 may include a plurality of microphones to sense a direction of sound. According to an embodiment, the electronic device 101 may include an audio module in which the speaker holes 247a and 247b and the microphone hole are implemented as one hole, or may include a speaker (e.g., a piezo speaker) from which the speaker hole 247a is excluded.

According to an embodiment, the camera modules 249a and 249b may include a first camera module 249a and/or a second camera module 249b. The second camera module 249b may be positioned in the second housing 202 and may photograph a subject in a direction opposite to the first display area A1 of the display 203. The electronic device 101 may include the multiple camera modules 249a and 249b. For example, the electronic device 101 may include at least one of a wide-angle camera, a telephoto camera, or a close-up camera, and include an infrared projector and/or an infrared receiver according to an embodiment, so as to measure a distance to a subject. The camera modules 249a and 249b may include one or more lenses, an image sensor, and/or an image signal processor. The electronic device 101 may further include another camera module (e.g., a front camera) (e.g., the first camera module 249a) configured to photograph a subject in an opposite direction of the second camera module 249b. For example, the first camera module 249a may be disposed around the first display area A1 or in an area overlapping the first display area A1, and when the first camera module 249a is disposed in an area overlapping the display 203, the first camera module 249a may photograph a subject through the display 203.

According to an embodiment, an indicator (e.g., an LED device) of the electronic device 101 may be disposed in the first housing 201 and/or the second housing 202, and may include a light-emitting diode to provide state information of the electronic device 101 via a visual signal. A sensor module (e.g., the sensor module 176 of FIG. 1) of the electronic device 101 may generate an electrical signal or data value corresponding to an external environment state or an internal operating state of the electronic device 101. The sensor module may include, for example, a proximity sensor, a fingerprint sensor, or a biometric sensor (e.g., an iris/face recognition sensor or an HRM sensor). In an embodiment, the electronic device 101 may further include at least one of a gesture sensor, a gyro sensor, an air pressure sensor, a magnetic sensor, an acceleration sensor, a grip sensor, a color sensor, an infrared (IR) sensor, a temperature sensor, a humidity sensor, or an illuminance sensor. The configuration of the display 203, the audio modules 247a and 247b, and the camera modules 249a and 249b of FIGS. 2A and 2B may be all or partly the same as the configuration of the display module 160, the audio module 170, and the camera module 180 of FIG. 1.

FIG. 4 is an exploded perspective view of an electronic device, according to one of an embodiment of the disclosure.

Referring to FIG. 4, the electronic device 101 may include the first housing 201, the second housing 202, the display 203, and the multi-bar structure 213. A part (e.g., the second display area A2) of the display 203 may be received in the electronic device 101 while being guided by the multi-bar structure 213. The configuration of the first housing 201, the second housing 202, and the display 203 of FIG. 4 may be all or partly the same as the configuration of the first housing 201, the second housing 202, and the display 203 of FIGS. 2 and/or 3.

According to an embodiment, the first housing 201 may include a first plate 211 and a slide cover 212. The first plate 211 and the slide cover 212 may linearly reciprocate in one direction (e.g., the direction of the arrow ① in FIG. 2) while being guided by the second housing 202. According to an embodiment, the first plate 211 may slidingly move with respect to the second housing 202 together with the slide cover 212. For example, at least a part of the display 203 and/or at least a part of the multi-bar structure 213 may be disposed between the first plate 211 and the slide cover 212.

According to an embodiment, the first plate 211 may support at least a part (e.g., the second display area A2) of the display 203. For example, the first plate 211 may include a curved surface 250, and at least a part of the second display area A2 of the display 203 may be positioned on the curved surface 250. According to an embodiment, the first plate 211 may be a display support bar (DSB).

According to an embodiment, the slide cover 212 may protect the display 203 positioned on the first plate 211. For example, the slide cover 212 may surround at least a part of the display 203. At least a part of the display 203 may be positioned between the first plate 211 and the slide cover 212. According to an embodiment, the first plate 211 and the slide cover 212 may be formed of a metal material and/or a non-metal (e.g., a polymer) material.

According to an embodiment, the first housing 201 may include a guide rail 215. According to an embodiment, the guide rail 215 may be connected to the first plate 211 and/or the slide cover 212. For example, the guide rail 215 may slidingly move with respect to the second housing 202 together with the first plate 211 and the slide cover 212.

According to an embodiment, the electronic device 101 may include the multi-bar structure 213. According to an embodiment, the multi-bar structure 213 may support the display 203. For example, the multi-bar structure 213 may be connected to the display 203. According to an embodiment, at least a part of the display 203 and the multi-bar structure 213 may be positioned between the first plate 211 and the slide cover 212. According to an embodiment, as the first housing 201 slidingly moves, the multi-bar structure 213 may move with respect to the second housing 202. In a closed state (e.g., FIG. 2), most of the multi-bar structure 213 may be received inside the second housing 202. According to an embodiment, at least a part of the multi-bar structure 213 may move to correspond to the curved surface 250 positioned at an edge of the first plate 211.

According to an embodiment, the multi-bar structure 213 may include multiple rods 214 (or bars). The multiple rods 214 may extend in a straight line to be disposed in parallel to a rotation axis R formed by the curved surface 250, and may be arranged in a direction (e.g., a direction in which the first housing 201 slidingly moves) perpendicular to the rotation axis R.

According to an embodiment, each of the rods 214 may orbit around another adjacent rod 214 while maintaining a parallel state with the other adjacent rod 214. According to an embodiment, as the first housing 201 slidingly moves, the multiple rods 214 may be arranged to form a curved shape or be arranged to form a planar shape. For example, as the first housing 201 slidingly moves, a part of the multi-bar structure 213 which faces the curved surface 250 may form a curved surface, and another part of the multi-bar structure 213 which does not face the curved surface 250 may form a flat surface. According to an embodiment, the second display area A2 of the display 203 may be mounted on or supported by the multi-bar structure 213, and in an opened state (e.g., FIG. 3), at least a part of the second display area A2 may be exposed to the outside of the second housing 202 together with the first display area A1. In a state in which the second display area A2 is exposed to the outside of the second housing 202, the multi-bar structure 213 may support or maintain the second display area A2 in a flat state by forming a substantially flat surface. According to an embodiment, the multi-bar structure 213 may be replaced with a flexible integral support member (not shown). According to an embodiment, the multi-bar structure 213 may be a display support multi-bar or a multi-joint hinge structure.

According to an embodiment, the guide rail 215 may guide the movement of the multiple rods 214. According to an embodiment, the guide rail 215 may include an upper guide rail adjacent to a (1-2)th sidewall (e.g., the (1-2)th sidewall 211b of FIG. 3), and a lower guide rail adjacent to a (1-3)th sidewall (e.g., the (1-3)th sidewall 211c of FIG. 3). According to an embodiment, the guide rail 215 may include a groove-shaped rail 215a disposed on the inner side of the guide rail 215, and a protruding portion 215b positioned on the inner side of the guide rail. At least a part of the protruding portion 215b may be surrounded by the rail 215a. According to an embodiment, the multi-bar structure 213 may be positioned between the upper guide rail and the lower guide rail, and may move while maintaining an insertion-coupling state with the upper guide rail and the lower guide rail. For example, upper end portions and/or lower end portions of the multiple rods 214 may slidingly move along the rail 215a while being sandwiched in the rail 215a.

According to an embodiment, when the electronic device 101 is opened (e.g., a slide-out operation), the size of an area where the display 203 is exposed to the outside may be increased. For example, by driving (e.g., driving for display slide-out) of a motor (e.g., a motor structure 261 of FIG. 5) and/or by an external force provided by a user, the first plate 211 connected to the motor structure 261 may slide out, and the protruding portion 215b inside the guide rail 215 may push the upper end portions and/or the lower end portions of the multiple rods 214. Accordingly, the display 203 having been received between the first plate 211 and the slide cover 212 may be extended to the front.

According to an embodiment, when the electronic device 101 is closed (e.g., a slide-in operation), the size of an area where the display 203 is exposed to the outside may be reduced. For example, by driving (e.g., driving for display slide-in) of a motor (e.g., the motor structure 261 of FIG. 5) and/or by an external force provided by a user, the first plate 211 on which the motor is disposed may slide in, and an outer portion (e.g., a portion other than the protruding portion 215b) of the guide rail 215 may push the upper end portions and/or lower end portions of the multiple rods 214. Accordingly, the display 203 having been extended may be received between the first plate 211 and the slide cover 212.

According to an embodiment, the second housing 202 may include a second plate 221, the cover member 222, and the back plate 223. According to an embodiment, the second plate 221 may support at least a part (e.g., the first display area A1) of the display 203. The first plate 221 may be disposed between the display 203 and a circuit board 204. According to an embodiment, the cover member 222 may receive components (e.g., a battery 289 (e.g., the battery 189 of FIG. 1) and the circuit board 204) of the electronic device 101, and may protect the components of the electronic device 101. According to an embodiment, the cover member 222 may be referred to as a book cover.

According to an embodiment, there may be multiple boards received in the second housing 202. A processor, a memory, and/or an interface may be mounted on the circuit board 204 which is a main board. The processor may include, for example, one or more of a central processing unit, an application processor, a graphic processing unit, an image signal processor, a sensor hub processor, or a communication processor. According to an embodiment, the circuit board 204 may include a flexible printed circuit board type radio frequency cable (FRC). For example, the circuit board 204 may be disposed in the cover member 222, and may be electrically connected to an antenna module (e.g., the antenna module 197 of FIG. 1) and a communication module (e.g., the communication module 190 of FIG. 1).

According to an embodiment, the memory may include, for example, a volatile memory or a nonvolatile memory.

According to an embodiment, the interface may include, for example, a high definition multimedia interface (HDMI), a universal serial bus (USB) interface, an SD card interface, and/or an audio interface. For example, the interface may electrically or physically connect the electronic device 101 to an external electronic device, and include a USB connector, an SD card/MMC connector, or an audio connector.

According to an embodiment, the electronic device 101 may further include a separate sub-circuit board 290 spaced apart from the circuit board 240 within the second housing 202. The sub-circuit board 290 may be electrically connected to the circuit board 240 through a flexible board 291. The sub-circuit board 290 may be electrically connected to the battery 289 or electrical components disposed at an end portion of the electronic device 101, such as a speaker and/or a SIM socket, so as to transmit a signal and power.

According to an embodiment, the battery 289 is a device for supplying power to at least one component of the electronic device 101, and may include, for example, a non-rechargeable primary cell, a rechargeable secondary cell, or a fuel cell. For example, at least a part of the battery 289 may be disposed substantially on the same plane as the circuit board 204. The battery 289 may be integrally disposed inside the electronic device 101 or may be disposed to be detachable from the electronic device 101.

According to an embodiment, the battery 289 may be configured as one integrated battery or may include multiple separable batteries (e.g., a first battery 289a and a second battery 289b). According to an embodiment, when an integrated battery is positioned on the first plate 211, the integrated battery may move along with a sliding movement of the first plate 211. According to an embodiment, when the integrated battery is positioned on the second plate 221, the integrated battery may be fixedly disposed on the second plate 221, regardless of a sliding movement of the first plate 211. For another example, when the first battery 289a among the separable batteries is positioned on the first plate 211 and the second battery 289b among the separable batteries is fixed on the second plate 221, only the first battery 289a may move along with a sliding movement of the first plate 211.

According to an embodiment, the back plate 223 may substantially configure the second housing 202 or at least a part of the external appearance of the electronic device 101.

For example, the back plate 223 may be coupled to the outer surface of the cover member 222. According to an embodiment, the back plate 223 may be integrally configured with the cover member 222. According to an embodiment, the back plate 223 may provide a decorative effect on the external appearance of the electronic device 101. The second plate 221 and the cover member 222 may be manufactured using at least one of a metal or a polymer, and the back plate 223 may be manufactured using at least one of a metal, glass, synthetic resin, or ceramic. According to an embodiment, the second plate 221, the cover member 222, and/or the back plate 223 may be at least partially (e.g., an auxiliary display area) made of a material which transmits light. For example, in a state in which a part (e.g., the second display area A2) of the display 203 is received inside the electronic device 101, the electronic device 101 may output visual information by using the second display area A2. The auxiliary display area may be a portion of the second plate 221, the cover member 222, and/or the back plate 223, in which the display 203 received in the second housing 202 is positioned.

According to an embodiment, the electronic device 101 may include a power transmission structure 260 for a sliding movement of the electronic device 101. The power transmission structure 260 may include a motor structure 261 for generating power, and a gear structure (e.g., a pinion gear 262 and/or a rack gear 263 of FIG. 5), at least a part of which is configured to move based on a driving force generated in the motor structure 261. According to an embodiment, the rack gear 263 may be connected to the first housing 201 (e.g., the first plate 211). The pinion gear 262 may rotate based on the driving force generated in the motor structure 261, and transmit at least a part of the driving force generated in the motor structure 261 to the rack gear 263. For example, the pinion gear 262 may be connected to the motor structure 261 and mesh with at least a part of the rack gear 263.

According to an embodiment, the electronic device 101 may include an elastic member 300. According to an embodiment, the elastic member 300 may be compressed or tensioned based on a sliding movement of the electronic device 101. According to an embodiment, the elastic member 300 may reduce a force required to open the electronic device 101. When the display 203 is unfolded, the elastic member 300 may provide a force (e.g., an elastic force) for offsetting at least a part of a repulsive force of the display 203 and/or a frictional force between components (e.g. the multi-bar structure 213 and/or the guide rail 215) of the electronic device 101. For example, the elastic member 300 offsets a repulsive force generated when the display 203 is unfolded, so that user convenience may be increased when the electronic device 101 is opened.

According to an embodiment, the elastic member 300 may include multiple (e.g., two) elastic members. For example, the elastic member 300 may include a first elastic member 310, and a second elastic member 320 arranged in parallel to the first elastic member 310.

The electronic device 101 illustrated in FIGS. 2 to 4 has a rollable or slidable external appearance, but the disclosure is not limited thereto. According to an embodiment (not shown), at least a part of the illustrated electronic device may be rolled into a scroll shape.

Referring to FIGS. 2, 3 and 4, when viewed from the front of the electronic device 101, the display 203 may extend in a right direction of the electronic device 101. However, a structure of the electronic device 101 is not limited thereto. For example, according to an embodiment, the display 203 may extend in a left direction of the electronic device 101. According to an embodiment, the display 203 may extend in a longitudinal direction of the electronic device 101.

Figure 5:
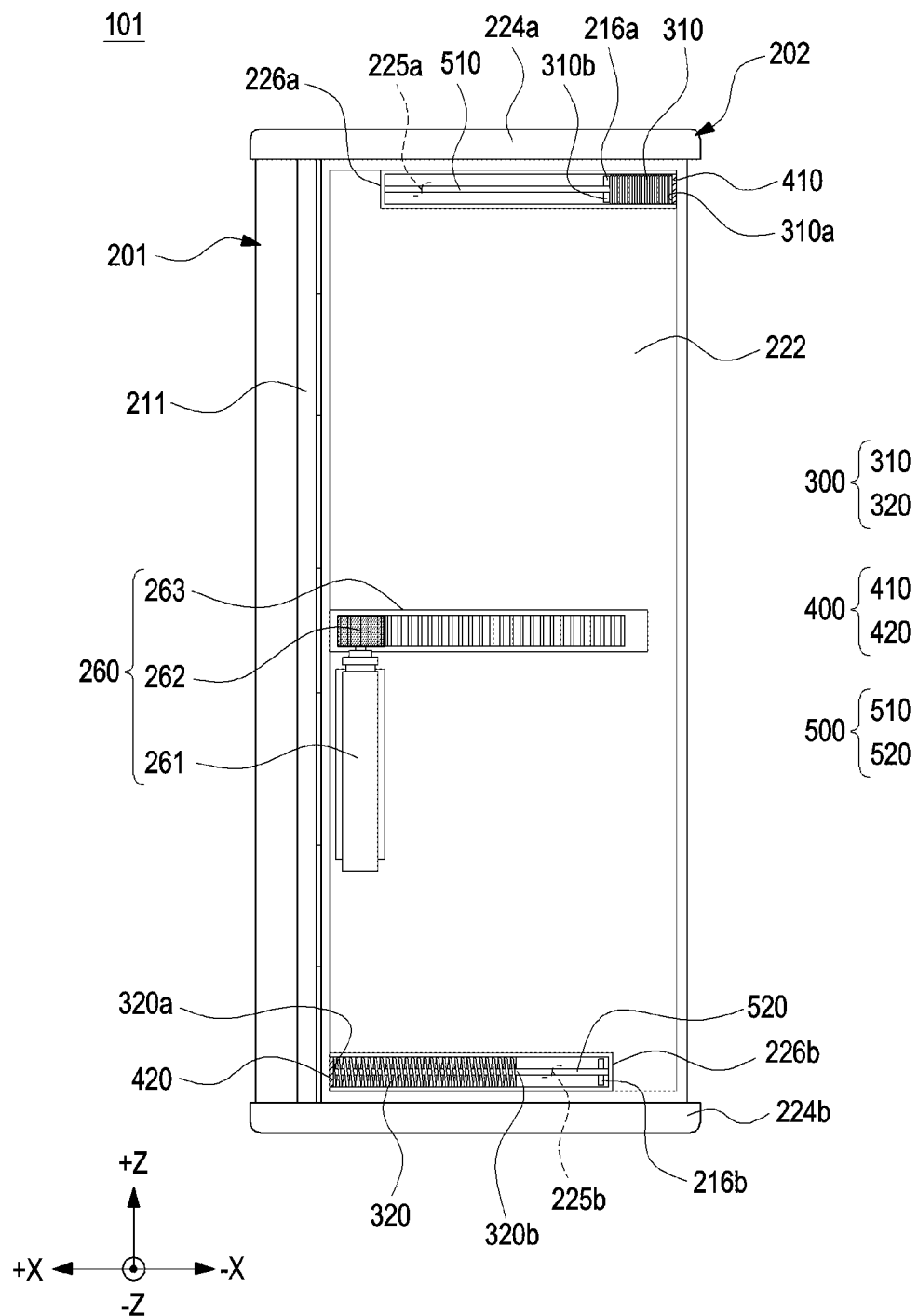
FIG. 5 is a front view of an electronic device in a closed state, according to an embodiment of the disclosure.
Figure 6:
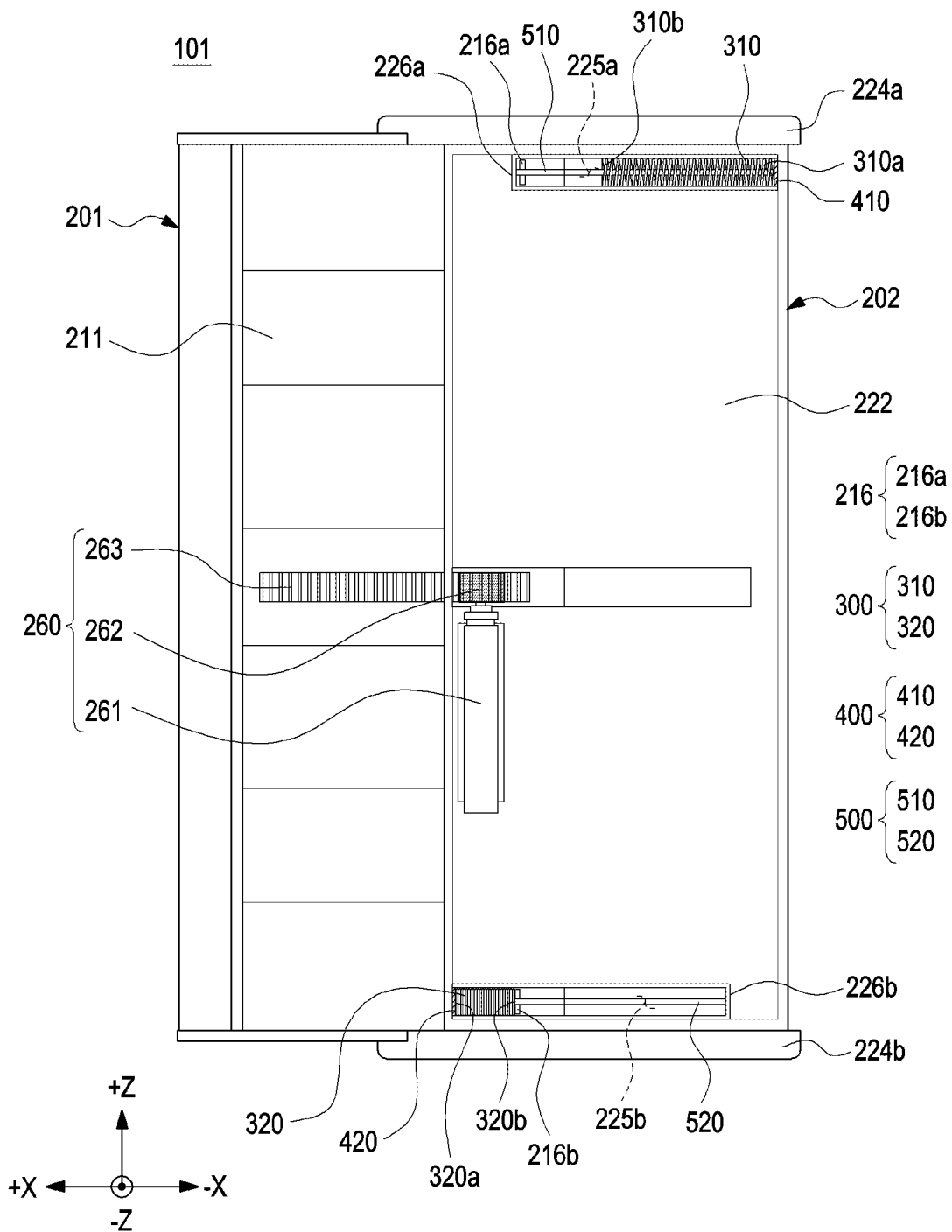
FIG. 6 is a front view of an electronic device in an opened state, according to an embodiment of the disclosure.

FIG. 5 is a front view of an electronic device in a closed state, according to an embodiment of the disclosure, and FIG. 6 is a front view of an electronic device in an opened state, according to an embodiment of the disclosure.

Referring to FIGS. 5 and 6, the electronic device 101 may include the first housing 201, the second housing 202, the power transmission structure 260, the elastic member 300, and a sensor module 400. The configuration of the first housing 201, the second housing 202, the power transmission structure 260, and the elastic member 300 of FIGS. 5 and 6 may be all or partly the same as the configuration of the first housing 201, the second housing 202, the power transmission structure 260, and the elastic member 300 of FIG. 4. The configuration of the sensor module 400 of FIGS. 5 and 6 may be all or partly the same as the configuration of the sensor module 176 of FIG. 1.

According to an embodiment, the first housing 201 may include a protruding area 216 for compressing the elastic member 300. For example, the protruding area 216 may be in contact with one end portion of the elastic member 300 to compress the elastic member 300. According to an embodiment, the protruding area 216 may be connected to a housing different from the elastic member 300. For example, the protruding area 216 may be connected to the first housing 201, and the elastic member 300 may be connected to the second housing 202. According to an embodiment (not shown), the elastic member 300 may be connected to the first housing 201 (e.g., the first plate 211), and the protruding area 216 may be connected to the second housing 202. The protruding area 216 may be a contact area and/or a locking area.

According to an embodiment, the protruding area 216 may be connected to the first housing 201. For example, the protruding area 216 may extend or protrude from the first plate 211. According to an embodiment, the protruding area 216 may be integrally configured with the first plate 211. According to an embodiment, the protruding area 216 may surround at least a part of a shaft 500. For example, the protruding area 216 may include a first protruding area 216a which surrounds at least a part of a first shaft 510 and faces a first elastic member 310, and a second protruding area 216b which surrounds at least a part of a second shaft 520 and faces a second elastic member 320.

According to an embodiment, the second housing 202 may include an upper sidewall 224a and a lower sidewall 224b which configure at least a part of the external appearance of the electronic device 101. The configuration of the upper sidewall 224a may be all or partly the same as the configuration of the (2-2)th sidewall 221b of FIGS. 2 and 3, and the configuration of the lower sidewall 224b may be all or partly the same as the configuration of the (2-3)th sidewall 221c of FIGS. 2 and 3.

According to an embodiment, the second housing 202 may include reception spaces 225a and 225b for receiving the elastic member 300 and/or the sensor module 400. According to an embodiment, the reception spaces 225a and 225b may include a first reception space 225a adjacent to the upper sidewall 224a, and a second reception space 225b adjacent to the lower sidewall 224b. According to an embodiment, the reception spaces 225a and 225b may be referred to as a groove, a recess, or an empty space formed in the cover member 222.

According to an embodiment, the elastic member 300 may be compressed based on a sliding movement of the electronic device 101. For example, one end portion of the elastic member 300 may be connected to the cover member 222 of the second housing 202, and the other end portion of the elastic member 300 may be in contact with the protruding area 216, based on a sliding movement of the first housing 201 and/or the electronic device 101. When the movement of the elastic member 300 is restricted by the protruding area 216, the elastic member 300 may be compressed. According to an embodiment, the elastic member 300 may be compressed along a width direction (e.g., a sliding direction (the X-axis direction) of the first housing 201). According to an embodiment, the elastic member 300 may be a spring or a coil. An elastic modulus k (e.g., a compression spring coefficient) of the elastic member 300 may satisfy Equation 1 below.

$$k = \frac{Gd^4}{8NaD^3} \quad \text{[Equation 1]}$$

In [Equation 1], G may be referred to as a transverse elastic modulus (N/mm²), Na may be referred to as an effective number of turns, D may be referred to as an average diameter of the elastic member 300, and d may be referred to as a diameter of a material (e.g., a spring). The average diameter D may be interpreted as an average value of an inner diameter and an outer diameter of the elastic member 300. The diameter (d) of the material may be interpreted as a diameter or thickness of the spring. According to an embodiment, the elastic member 300 may be referred to, for example, as an elastic structure, a compression member, or a compression structure.

According to an embodiment, at least a part of the elastic member 300 may be disposed in the reception spaces 225a and 225b of the cover member 222. For example, the first elastic member 310 may be disposed in the first reception space 225a, and the second elastic member 320 may be disposed in the second reception space 225b. According to an embodiment, the elastic member 300 may include the first elastic member 310 disposed in the first reception space 225a, and the second elastic member 320 disposed in the second reception space 225b. According to an embodiment (not shown), when one elastic member 300 is used, the length of the elastic member 300 is required to be increased. When the length of the elastic member 300 is increased, a compressive force of the elastic member 300 is increased, and may exceed resolution which is sensible by the sensor module 400.

According to an embodiment, the first elastic member 310 may include a first end portion 310a connected to a first sensor module 410, and a second end portion 310b which is opposite the first end portion 310a and faces the first protruding area 216a. The second elastic member 320 may include a third end portion 320a connected to a second sensor module 420, and a fourth end portion 320b which is opposite the third end portion 320a and faces the second protruding area 216b.

According to an embodiment, the elastic member 300 may be connected to the cover member 222 of the second housing 202 using the sensor module 400. For example, the sensor module 400 may be disposed on inner walls 226a and 226b defining at least a part of the reception spaces 225a and 225b of the cover member 222. According to an embodiment, the elastic member 300 may be connected to the sensor module 400.

According to an embodiment, the first elastic member 310 may be compressed in a direction different from that of the second elastic member 320. For example, in a state in which the electronic device 101 is fully closed (e.g., FIG. 5), the first elastic member 310 may be compressed and the second elastic member 320 may be fully unfolded. In a state in which the electronic device 101 is fully opened (e.g., FIG. 6), the first elastic member 310 may be fully unfolded and the second elastic member 320 may be compressed. According to an embodiment, when the first housing 201 slidingly moves in a first direction (the +X direction), the second elastic member 320 may come into contact with the second protruding area 216b to be compressed. When the first housing 201 moves in a second direction (the −X direction), the first elastic member 310 may come into contact with the first protruding area 216a to be compressed.

According to an embodiment, the sensor module 400 may sense a pressure provided by the elastic member 300. For example, the sensor module 400 may include a pressure sensor or a pressure gauge, and may sense a force and/or pressure transmitted from one end portion (e.g., the first end portion 310a or the third end portion 320a) of the elastic member 300. According to an embodiment, the sensor module 400 may include a strain gauge.

According to an embodiment, the sensor module 400 may be disposed in the second housing 202. For example, the sensor module 400 may be connected to the cover member 222. For example, the first sensor module 410 may be disposed on a first inner wall 226a configuring the first reception space 225a, and the second sensor module 420 may be disposed on a second inner wall 226b configuring the second reception space 225b. According to an embodiment, the sensor module 400 may be disposed between the elastic member 300 and the cover member 222.

According to an embodiment, the electronic device 101 may include the shaft 500 for guiding the movement of the elastic member 300. For example, at least a part of the shaft 500 may be surrounded by the elastic member 300. The shaft 500 may extend along a sliding direction (e.g., the X-axis direction) of the electronic device 101, and the elastic member 300 may be compressed or tensioned along the shaft 500. According to an embodiment, the shaft 500 may include the first shaft 510 for guiding the movement of the first elastic member 310, and the second shaft 520 for guiding the movement of the second elastic member 320. The first shaft 510 may be disposed in the first reception space 225a, and connected to the first inner wall 226a. The second shaft 520 may be disposed in the second reception space 225b, and connected to the second inner wall 226b. According to an embodiment, the first shaft 510 may be connected to the cover member 222 of the second housing 202 at a point adjacent to the upper sidewall 224a, and the second shaft 520 may be connected to the cover member 222 of the second housing 202 at a point adjacent to the lower sidewall 224b. The elastic member 300 slidingly moves along the shafts 510 and 520 at the points adjacent to the upper sidewall 224a and the lower sidewall 224b, and distortion of the electronic device 101 may be reduced.

Referring to FIGS. 5 and 6, the first elastic member 310, the first sensor module 410, and the first shaft 510, as components for sensing a pressure when the electronic device 101 slides in, may be manufactured as one part (e.g., a first module). The second elastic member 320, the second sensor module 420, and the second shaft 520, as components for sensing a pressure when the electronic device 101 slides out, may be manufactured as one part (e.g., a second module).

Figure 7:
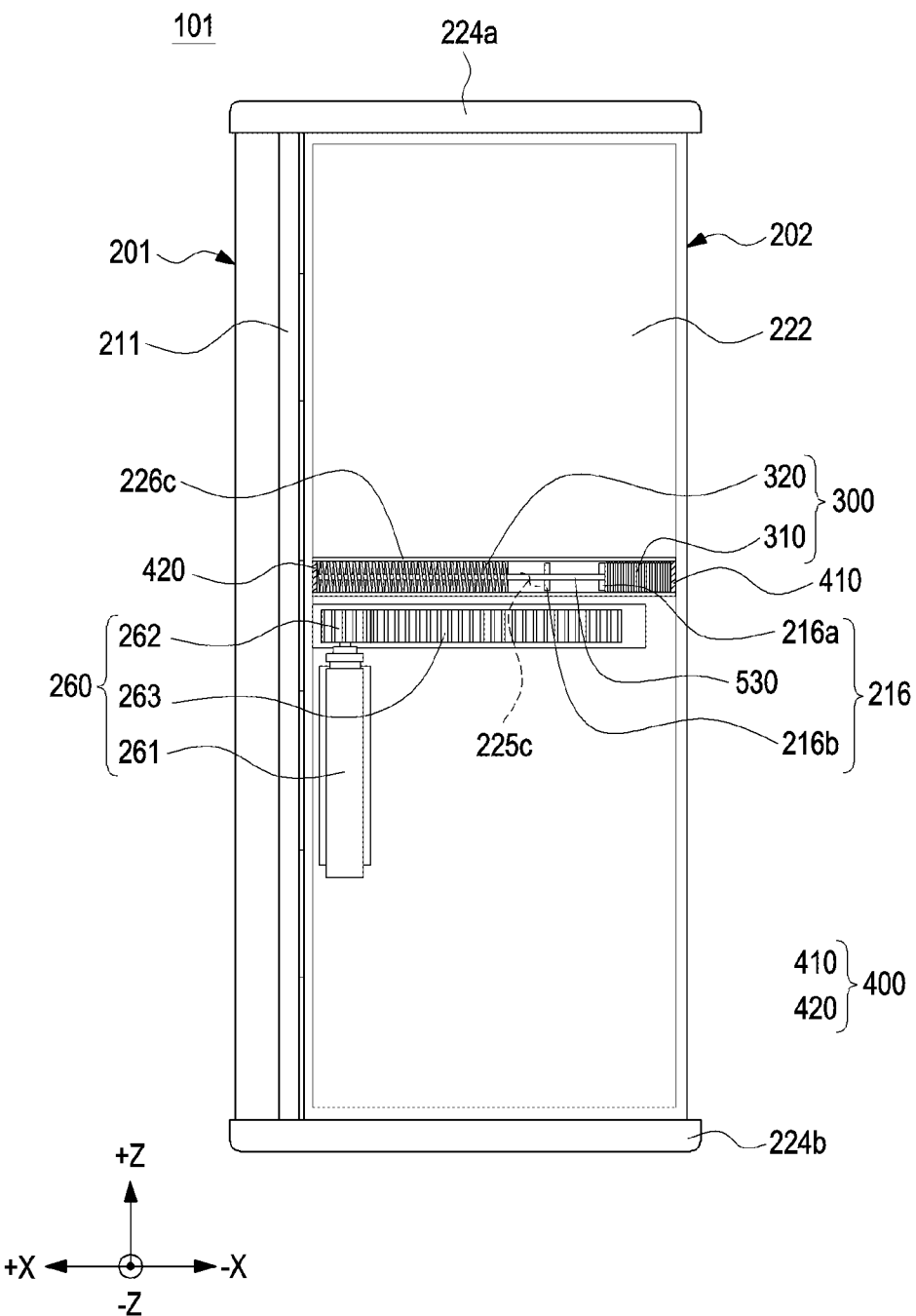
FIG. 7 is a front view of an electronic device in a closed state, according to an embodiment of the disclosure.
Figure 8:
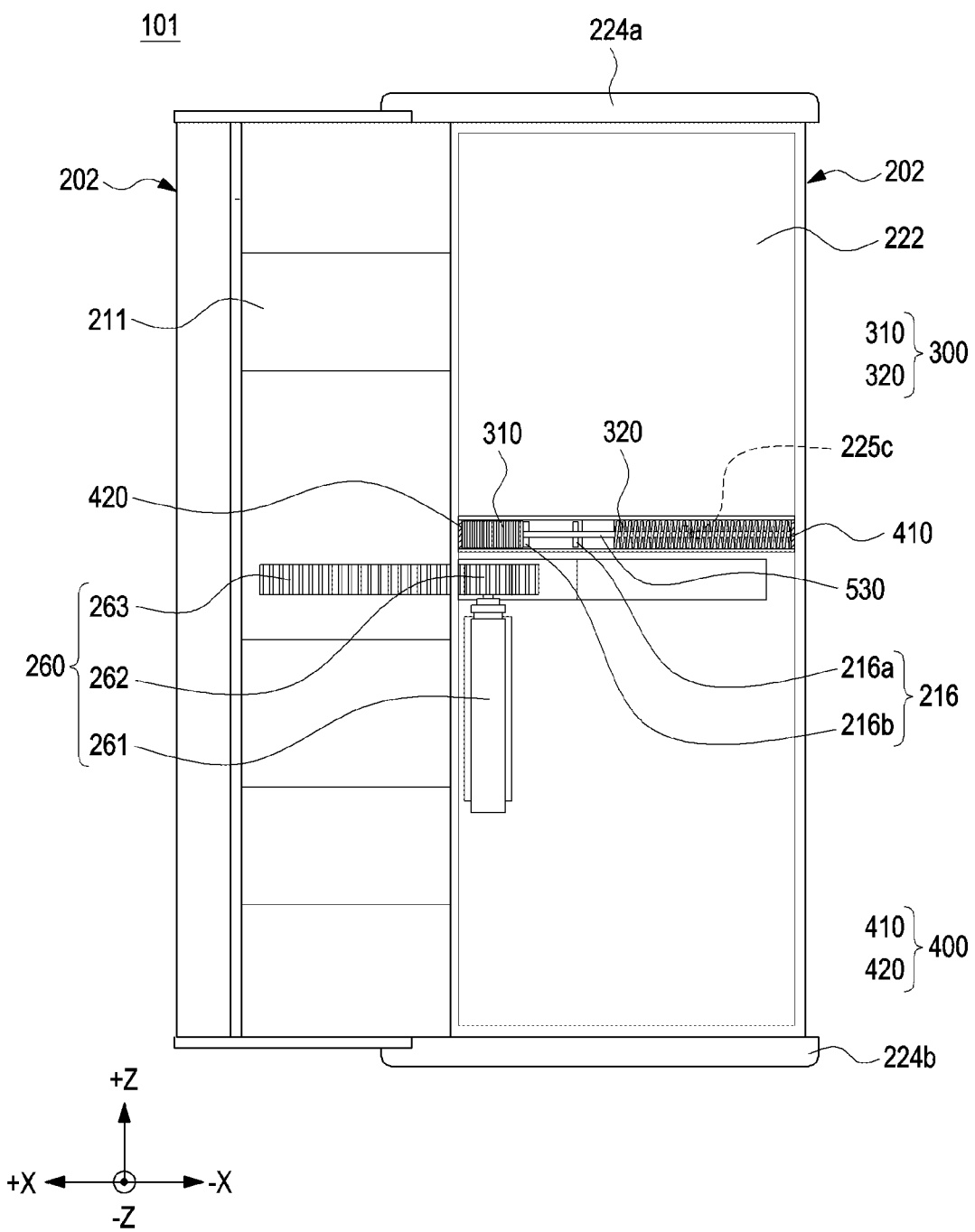
FIG. 8 is a front view of an electronic device in an opened state, according to an embodiment of the disclosure.

FIG. 7 is a front view of an electronic device in a closed state, according to an embodiment of the disclosure, and FIG. 8 is a front view of an electronic device in an opened state, according to an embodiment of the disclosure.

Referring to FIGS. 7 and 8, the electronic device 101 may include the first housing 201, the second housing 202, the power transmission structure 260, the elastic member 300, and the sensor module 400. The configuration of the first housing 201, the second housing 202, the power transmission structure 260, the elastic member 300, and the sensor module 400 of FIGS. 7 and 8 may be all or partly the same as the configuration of the first housing 201, the second housing 202, the power transmission structure 260, the elastic member 300, and the sensor module 400 of FIGS. 5 and 6.

According to an embodiment, the first housing 201 may include the protruding area 216 (e.g., the protruding area 216 of FIGS. 5 and 6) for compressing the elastic member 300. According to an embodiment, the first protruding area 216a may face the second protruding area 216b. For example, the first protruding area 216a and the second protruding area 216b may be positioned in one reception space (e.g., a third reception space 225c).

According to an embodiment, the second housing 202 may include a reception space 225c for receiving the elastic member 300 and/or the sensor module 400. According to an embodiment, the reception space 225c may include the third reception space 225c which receives the first elastic member 310, the second elastic member 320, the first sensor module 410, and the second sensor module 420. The third reception space 225c may be referred to as a groove, a recess, or an empty space formed in the cover member 222.

According to an embodiment, the first elastic member 310 and the second elastic member 320 may be arranged along substantially the same axis. For example, the first elastic member 310 and the second elastic member 320 may be disposed in one reception space (e.g., the third reception space 225c). For example, the electronic device 101 may include a third shaft 530 disposed in the third reception space 225c and extending along a sliding movement direction (e.g., the X-axis direction) of the first housing 201. At least a part of the third shaft 530 may be surrounded by the first elastic member 310 and the second elastic member 320. According to an embodiment, the first elastic member 310 and the second elastic member 320 may be compressed or tensioned along the third shaft 530. According to an embodiment, the third shaft 530 may be disposed between the first sensor module 410 and the second sensor module 420. For example, one end portion of the third shaft 530 may face the first sensor module 410 and the other end portion thereof may face the second sensor module 420.

FIGS. 9A, 9B, 9C, and 10 are views illustrating a movement of an elastic member based on a sliding movement of an electronic device according to an embodiment of the disclosure.

Figure 9A:
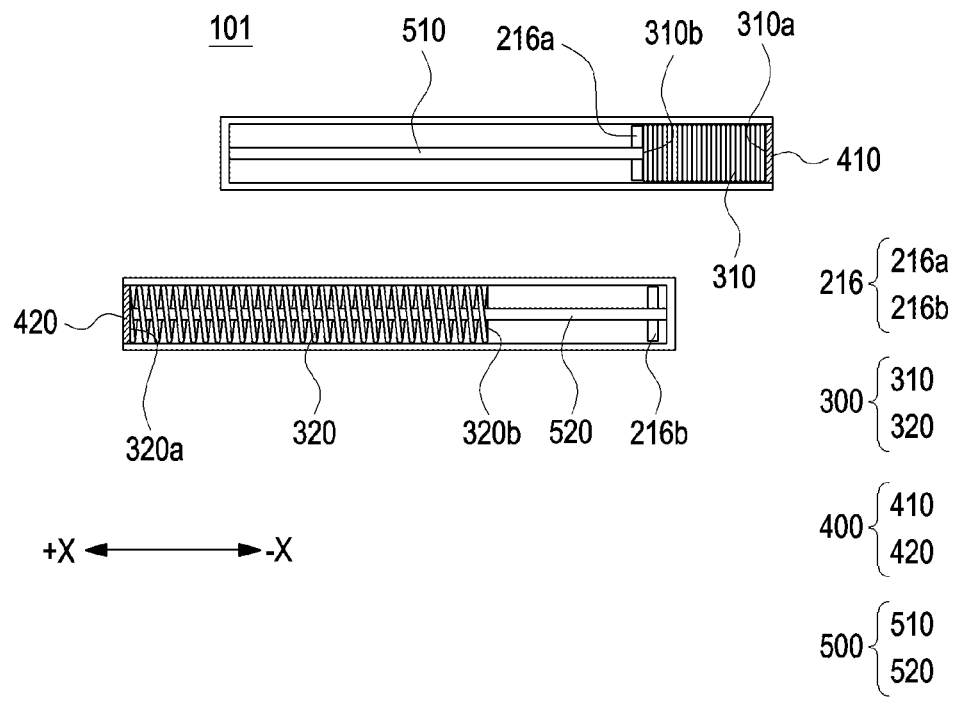
FIGS. 9A, 9B, 9C, and 10 are views illustrating a movement of an elastic member based on a sliding movement of an electronic device according to an embodiment of the disclosure.
Figure 9B:
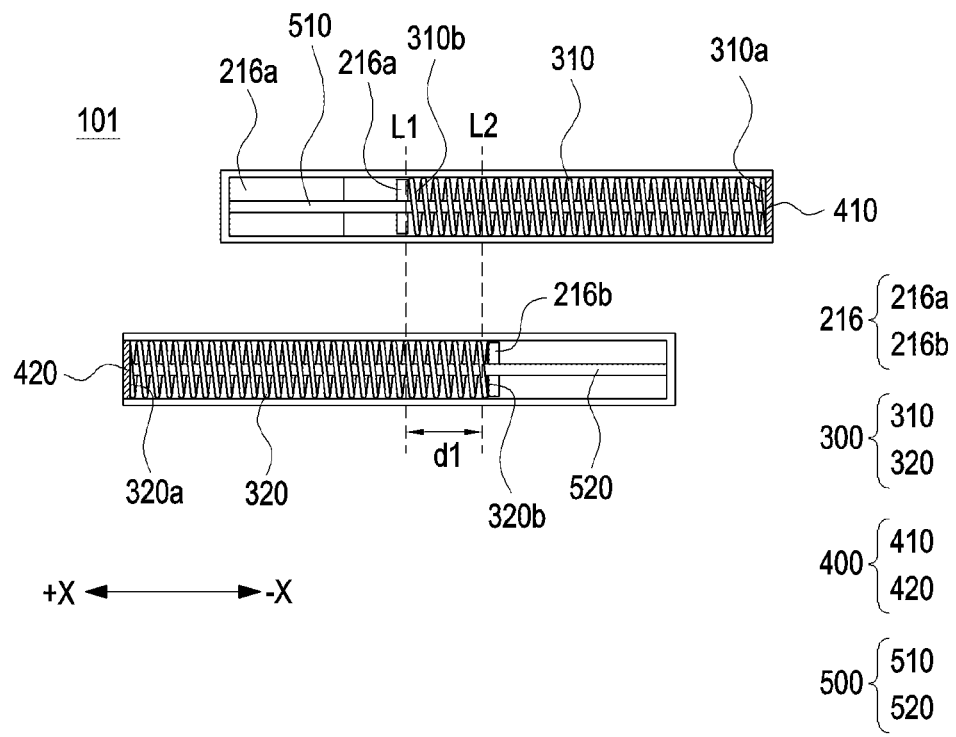
Figure 9C:
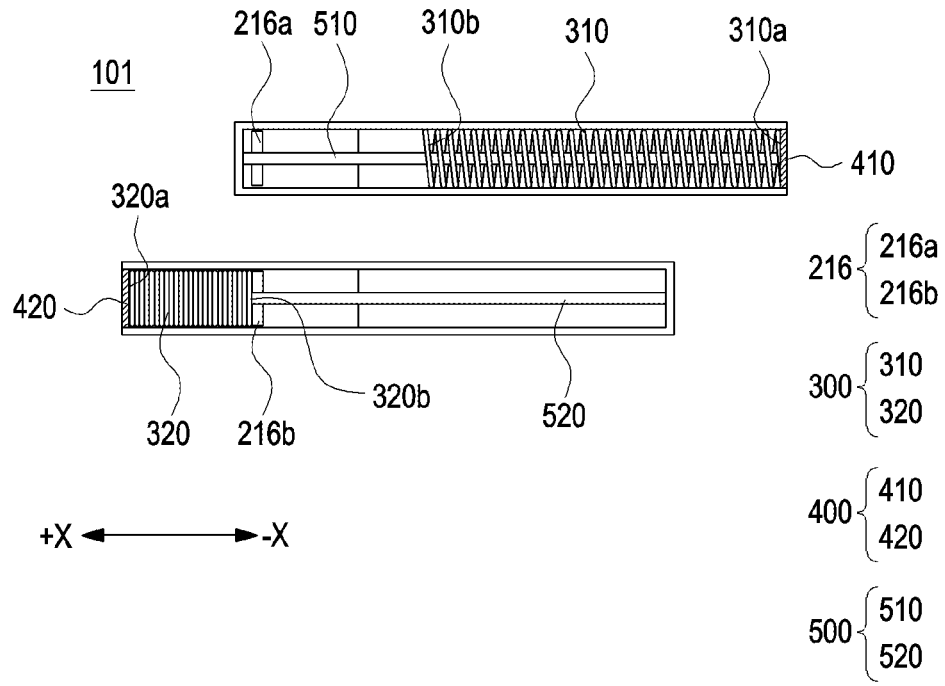
Figure 10:
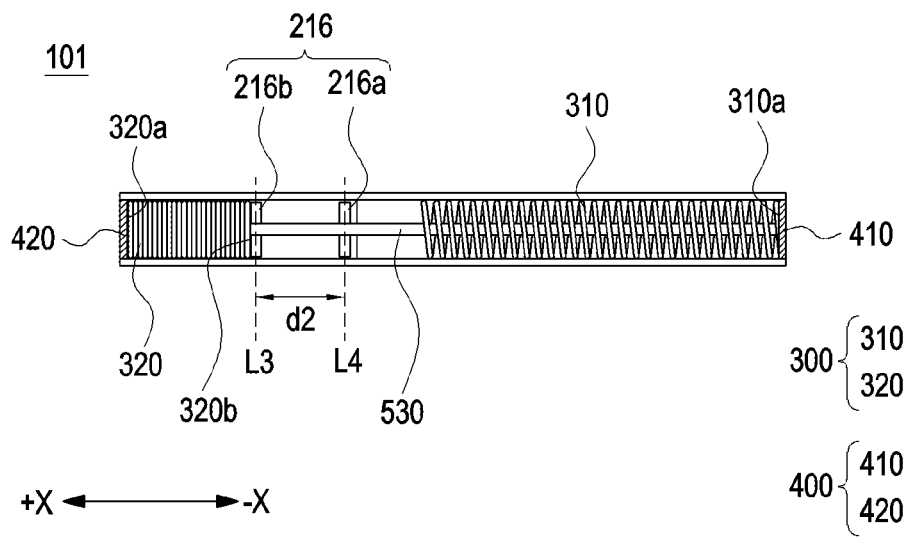

For example, FIGS. 9A, 9B, and 9C are views of the electronic device 101 of FIGS. 5 and/or 6 in which FIG. 9A is a view of the electronic device 101 in a fully closed state (e.g., FIG. 2), FIG. 9C is a view of the electronic device 101 in a fully opened state (e.g., FIG. 3), and FIG. 9B is a view illustrating a state in which the first elastic member 310 and the second elastic member 320 are maximally tensioned (or extended). FIG. 10 is a view illustrating structures of the elastic member 300 and the sensor module 400 of FIGS. 7 and/or 8.

Referring to FIGS. 9A, 9B, 9C, and 10, the electronic device 101 may include the protruding area 216, the elastic member 300, the sensor module 400, and the shaft 500. The configuration of the protruding area 216, the elastic member 300, the sensor module 400, and the shaft 500 of FIGS. 9A, 9B, 9C, and/or 10 may be all or partly the same as the configuration of the protruding area 216, the elastic member 300, the sensor module 400, and the shaft 500 of FIGS. 5, 6, 7, and 8.

According to an embodiment, the first elastic member 310 and the second elastic member 320 may be symmetrically compressed. According to an embodiment, the first elastic member 310 may be compressed when the electronic device 101 slidingly moves in a second direction (the −X direction) in which the electronic device 101 is closed, and the second elastic member 320 may be compressed when the electronic device 101 slidingly moves in a first direction (the +X direction) in which the electronic device 101 is opened. For example, the compressive strength of the first elastic member 310 may increase when the first housing 201 is moved in the second direction (the −X direction), and the compressive strength of the second elastic member 320 may increase when the first housing 201 is moved in the first direction (the +X direction). According to an embodiment, the first elastic member 310 may be maximally compressed when the electronic device 101 is fully closed, and the second elastic member 320 may be maximally compressed when the electronic device 101 is fully opened.

Referring to FIG. 9A, in a state in which the electronic device 101 is closed, the second end portion 310b of the first elastic member 310 may be compressed by a pressure provided in the first protruding area 216a, and the fourth end portion 320b of the second elastic member 320 may be spaced apart from the second protruding area 216b. Referring to FIG. 9C, in a state in which the electronic device 101 is fully opened, the second end portion 310b of the first elastic member 310 may be spaced apart from the first protruding area 216a, and the fourth end portion 320b of the second elastic member 320 may be compressed by a pressure provided in the second protruding area 216b. According to an embodiment, at least one of the first elastic member 310 and the second elastic member 320 may be at least partially compressed. For example, in a first state (e.g., FIG. 9A) or in a first section I1 of FIG. 12, at least a part of the first elastic member 310 may be compressed, and the second elastic member 320 may not be compressed. In a second state (e.g., FIG. 9B) or in a second section I2 of FIG. 12, at least a part of the first elastic member 310 and at least a part of the second elastic member 320 may be compressed. In a third state (e.g., FIG. 9C) or in a third section I3 of FIG. 12, the first elastic member 310 may not be compressed, and at least a part of the second elastic member 320 may be compressed. Referring to FIG. 9B, at least a part of the first elastic member 310 may overlap at least a part of the second elastic member 320. For example, a first imaginary line L1 on which the second end portion 310b of the first elastic member 310 is positioned may be spaced apart by a first distance d1 in the second direction (the −X direction) with respect to a second imaginary line L2 on which the fourth end portion 320b of the second elastic member 320 is positioned. According to an embodiment, when the first elastic member 310 and the second elastic member 320 are respectively maximally tensioned (or extended and/or stretched), at least a part of the first elastic member 310 may be positioned in the same section as at least a part of the second elastic member 320. According to an embodiment, the magnitude of a pressure provided by the elastic member 300 to the sensor module 400 may be changed based on the size of the first distance d1. For example, at least a part of the first elastic member 310 and/or at least a part of the second elastic member 320 may be arranged or configured to be compressed, and the sensor module 400 may receive a pressure equal to or greater than resolution of the sensor module 400 from the first elastic member 310 and/or the second elastic member 320.

Referring to FIG. 10, the protruding area 216 may be positioned such that at least one elastic member (e.g., the first elastic member 310 and/or the second elastic member 320) is compressed. For example, a second distance d2 between a third imaginary line L3 on which the second protruding area 216b is positioned and a fourth imaginary line L4 on which the first protruding area 216a is positioned may be arranged such that at least one of the first elastic member 310 and the second elastic member 320 is compressed.

According to an embodiment, the magnitude of a pressure provided by the elastic member 300 to the sensor module 400 may be changed based on the size of the second distance d2. For example, the first protruding area 216a and the second protruding area 216b may be arranged to compress at least a part of the first elastic member 310 and/or at least a part of the second elastic member 320, and the sensor module 400 may receive a pressure equal to or greater than resolution of the sensor module 400 from the first elastic member 310 and/or the second elastic member 320.

The state in FIG. 9B may be a state in which the electronic device 101 is partially opened. However, for explanation, in FIG. 9B, the maximally tensioned first elastic member 310 and the maximally tensioned second elastic member 320 are shown, but in a state in which the electronic device 101 is assembled, a state in which the first elastic member 310 is maximally tensioned and a state in which the second elastic member 320 is maximally tensioned may not exist simultaneously. For example, FIG. 9B is a view illustrating a state in which the first elastic member 310 and the second elastic member 320 are maximally tensioned, respectively, and when the electronic device 101 slidingly moves, the first elastic member 310 and/or the second elastic member 320 may be compressed by receiving a pressure from the protruding area 216.

Figure 11:
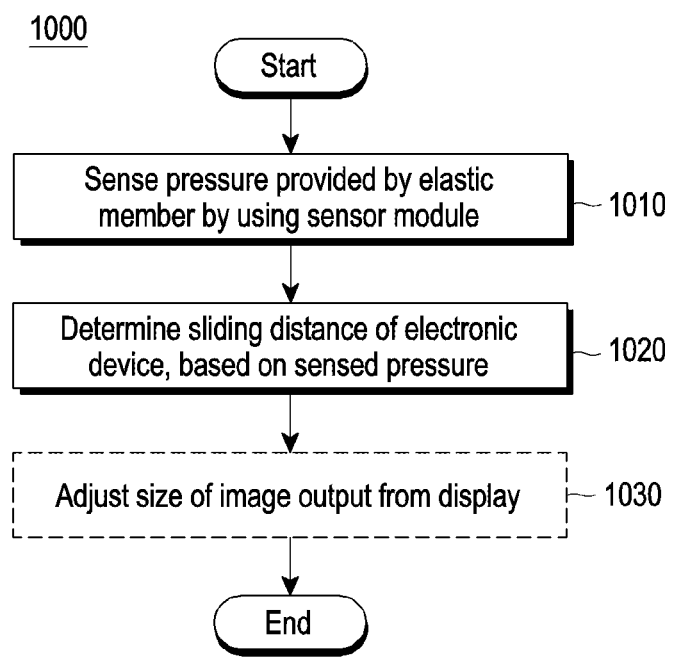
FIG. 11 is a flowchart illustrating an operation of an electronic device, according to an embodiment of the disclosure.
Figure 12:
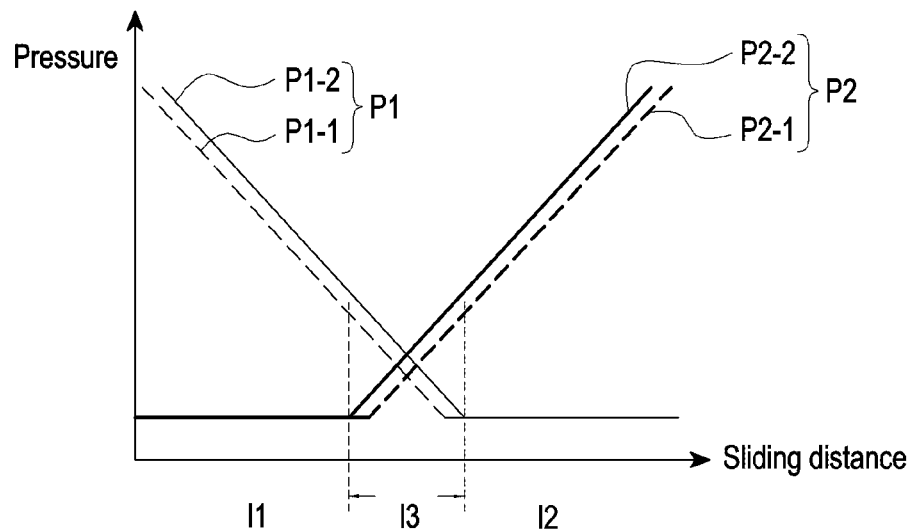
FIG. 12 is a view illustrating a pressure value detected by a sensor module, based on a sliding distance, according to an embodiment of the disclosure.
Figure 13:
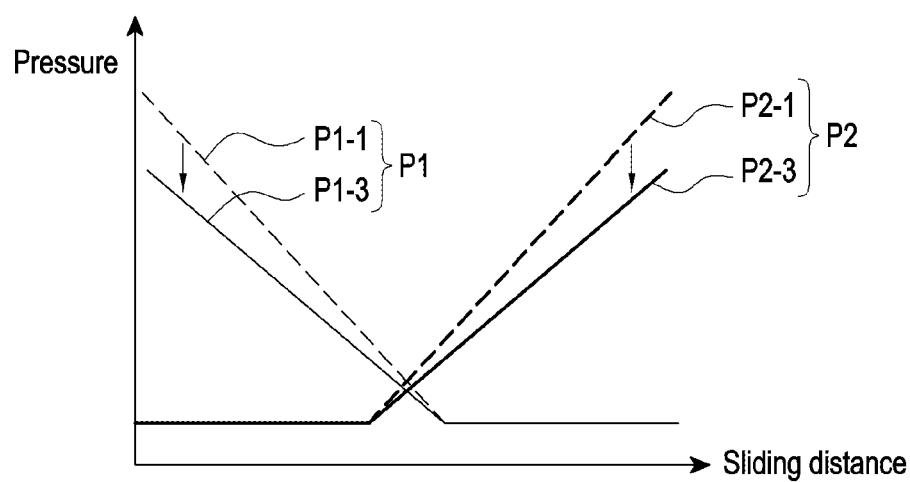
FIG. 13 is a view illustrating a pressure sensor in which an elastic modulus is changed, according to an embodiment of the disclosure.

FIG. 11 is a flowchart illustrating an operation of an electronic device, according to an embodiment of the disclosure. FIG. 12 is a view illustrating a pressure value detected by a sensor module, based on a sliding distance, according to an embodiment of the disclosure. FIG. 13 is a view illustrating a pressure sensor in which an elastic modulus is changed, according to an embodiment of the disclosure.

Referring to FIG. 11, operation 1000 of the electronic device 101 may include operation 1010 of sensing a pressure provided by the elastic member 300 by using the sensor module 400, operation 1020 of determining a sliding distance of the electronic device 101, based on the sensed pressure, and/or operation 1030 of adjusting a size of an image output from the display 203. The configuration of the electronic device 101, the display 203, the elastic member 300, and the sensor module 400 of FIG. 11 may be all or partly the same as the configuration of the electronic device 101, the display 203, the elastic member 300, and the sensor module 400 of FIG. 3 and/or FIG. 5.

According to an embodiment, the sensor module 400 may perform the operation 1010 of sensing a pressure provided by the elastic member 300. For example, the sensor module 400 may include a pressure sensor or a pressure gauge, and may sense a force and/or pressure transmitted from one end portion (e.g., the first end portion 310a or the third end portion 320a) of the elastic member 300. According to an embodiment, the sensor module 400 may include a strain gauge.

According to an embodiment, a processor (e.g., the processor 120 of FIG. 1) may perform the operation 1020 of determining a sliding distance (or a sliding movement distance) of the electronic device 101, based on the pressure obtained by the sensor module 400. The slide distance may be referred to as the distance of the first housing 201 with respect to the second housing 202.

Referring to FIG. 12, the processor 120 may determine a sliding distance of the electronic device 101, based on different pressure sensors for each section. For example, the processor 120 may determine a sliding distance, based on a first pressure P1 obtained by a first sensor module (e.g., the first sensor module 410 of FIG. 5 or 7) in a first section I1, and may determine a sliding distance, based on a second pressure P2 obtained using a second sensor module (e.g., the second sensor module 420 of FIG. 5 or 7) in a second section I2. The first pressure P1 may be referred to, for example, as a pressure value of a first elastic member (e.g., the first elastic member 310 of FIG. 5 or 7) sensed by the first sensor module 410, and the second pressure P2 may be referred to, for example, as a pressure value of a second elastic member (e.g., the second elastic member 320 of FIG. 5 or 7) sensed by the second sensor module 420. The first section I1 may be referred to, for example, as a section in which a pressure is sensed by the first sensor module 410 and a pressure is not sensed by the second sensor module 420. The second section I2 may be referred to, for example, as a section in which a pressure is sensed by the second sensor module 420 and a pressure is not sensed by the first sensor module 410. For example, the first section I1 may be a section from a state in which the electronic device 101 is closed to a state in which the electronic device 101 is opened for a predetermined section (e.g., slide distance until the second pressure P2 is sensed), and the second section I2 may be interpreted as a section from a state in which the electronic device 101 is opened for a predetermined section (e.g., slide distance at which the first pressure P1 is not sensed) to a state in which the electronic device 101 is fully opened.

According to an embodiment, the processor 120 may determine a sliding distance of the electronic device 101, based on at least one of the first pressure P1 obtained by the first sensor module 410 or the second pressure P2 obtained by the second sensor module 420 in a third section I3. For example, the third section I3 may be a section in a state in which the electronic device 101 is opened for a predetermined section (or a section in a state in which the electronic device 101 is closed for a predetermined section). According to an embodiment, the processor 120 may determine a sliding distance of the electronic device 101, based on the greater pressure among the first pressure P1 and the second pressure P2 in the third section I3. According to an embodiment, the processor 120 may determine a sliding distance, based on the first pressure P1 sensed by the first sensor module 410, when the electronic device 101 moves in an open direction in the third section I3, and may determine the sliding distance, based on the second pressure P2 sensed by the second sensor module 420, when the electronic device 101 moves in a closed direction.

Referring to FIG. 12, the magnitude of a pressure of the elastic member 300 may be changed based on a position of a protruding area (e.g., the protruding area 216 and/or the elastic member 300 of FIG. 5 or 7). For example, as a first distance (e.g., the first distance d1 of FIG. 9B) and/or a second distance (e.g., the second distance d2 of FIG. 10) increases, a length in which the first elastic member 310 and the second elastic member 320 are compressed together may increase. According to an embodiment, the magnitude of a 1st first ((1-1)th) pressure P1-1 of an electronic device (e.g., the electronic device 101 of FIG. 9B) in which the first elastic member 310 and the second elastic member 320 have a first distance d1 may be smaller than the magnitude of a 2nd first ((1-2)th) pressure P1-2 of the electronic device in which a distance between the first elastic member 310 and the second elastic member 320 is longer than the first distance d1 (not shown).

According to an embodiment, the magnitude of a 1st second ((2-1)th) pressure P2-1 of an electronic device (e.g., the electronic device 101 of FIG. 10) in which the first protruding area 216a and the second protruding area 216b are disposed to have a second distance d2 may be smaller than the magnitude of a 2nd second ((2-2)th) pressure P2-2 of the electronic device in which a distance between the first protruding area 216a and the second protruding area 216b is longer than the first distance d1 (not shown).

According to an embodiment, the electronic device 101 may include a memory 130 (e.g., the memory 130 of FIG. 1) configured to store sliding distance information corresponding to a pressure. The processor 120 may determine a sliding distance of the electronic device 101, based on the sliding distance information. For example, the processor 120 may select sliding distance information corresponding to the pressure, and determine a sliding distance of the electronic device 101, based on the selected sliding distance information.

Referring to FIG. 13, an elastic modulus of the elastic member 300 may be changed. For example, as compression and/or tension (or expansion) of the elastic member 300 is repeated, a transverse elastic modulus (G in Equation 1) of the elastic member 300 may be reduced. The processor (e.g., the processor 120 of FIG. 1) may determine an elastic modulus of the elastic member 300 which is changed.

According to an embodiment, the processor 120 may determine a first state in which the electronic device 101 is fully opened or a second state in which the electronic device 101 is closed. For example, the sensor module 400 may include at least one magnetic body disposed in a housing (e.g., the housing 200 of FIG. 2), and at least one magnetic sensor (e.g., a Hall effect sensor) configured to sense the magnetic body. The magnetic sensor may sense a magnetic body in a state in which the electronic device 101 is fully closed (e.g., FIG. 2) and/or in a state in which the electronic device 101 is fully opened (e.g., FIG. 3). The processor 120 may determine a pressure in a first state in which the electronic device 101 is fully opened or in a second state in which the electronic device 101 is fully closed, based on the magnetic sensor.

According to an embodiment, the memory 130 may store information on a pressure in an initial state (e.g., the (1-1)th pressure P1-1 and the (2-1)th pressure P2-1). According to an embodiment, the processor 120 may compare the (1-1)th pressure P1-1 and a 3rd first ((1-3)th) pressure P1-3 to determine an elastic modulus of the first elastic member 310, and compare the (2-1)th pressure P2-1 and a 3rd second ((2-3)th) pressure P2-3 to determine an elastic modulus of the second elastic member 320. The processor 120 may determine a sliding distance of the electronic device 101, based on the determined elastic modulus. According to an embodiment, the processor 120 may adjust a sliding distance corresponding to the (1-3)th pressure P1-3, based on a difference between the (1-1)th pressure P1-1 and the (1-3)th pressure P1-3, and adjust a sliding distance corresponding to the (2-3)th pressure P2-3, based on a difference between the (2-1)th pressure P2-1 and the (2-3)th pressure P2-3. For example, in a case in which a measured value of the pressure (e.g., the (1-3)th pressure P1-3 and the (2-3)th pressure P2-3) in the first state or the second state is lower than a value of the pressure (e.g., the (1-1)th pressure P1-1 and the (2-1)th pressure P2-1) in the first state or the second state stored in the memory 130 by a predetermined value (e.g., 10%), the processor 120 may correct a sliding distance of the electronic device 101 to a sliding distance corresponding to a pressure value increased by the predetermined value (e.g., 10%) from a value of the (1-3)th pressure P1-3 sensed by the first sensor module 410.

According to an embodiment, the processor 120 may perform the operation 1030 of changing a size of an image output from a display (e.g., the display 203 of FIG. 3), based on a sliding distance of the electronic device 101. For example, an area in which the display 203 is exposed to the outside of the electronic device 101 and a length of the elastic member 300 may be changed based on a sliding movement of the electronic device 101. Due to the change in the length of the elastic member 300, a pressure sensed by the sensor module 400 may be changed. The processor 120 may change a size of an image output from the display 203, based on the pressure sensed by the sensor module 400. For example, the processor 120 may increase a ratio of the width of the image output from the display 203 as a second display area (e.g., the second display area A2 of FIG. 3) increases.

Figure 14:
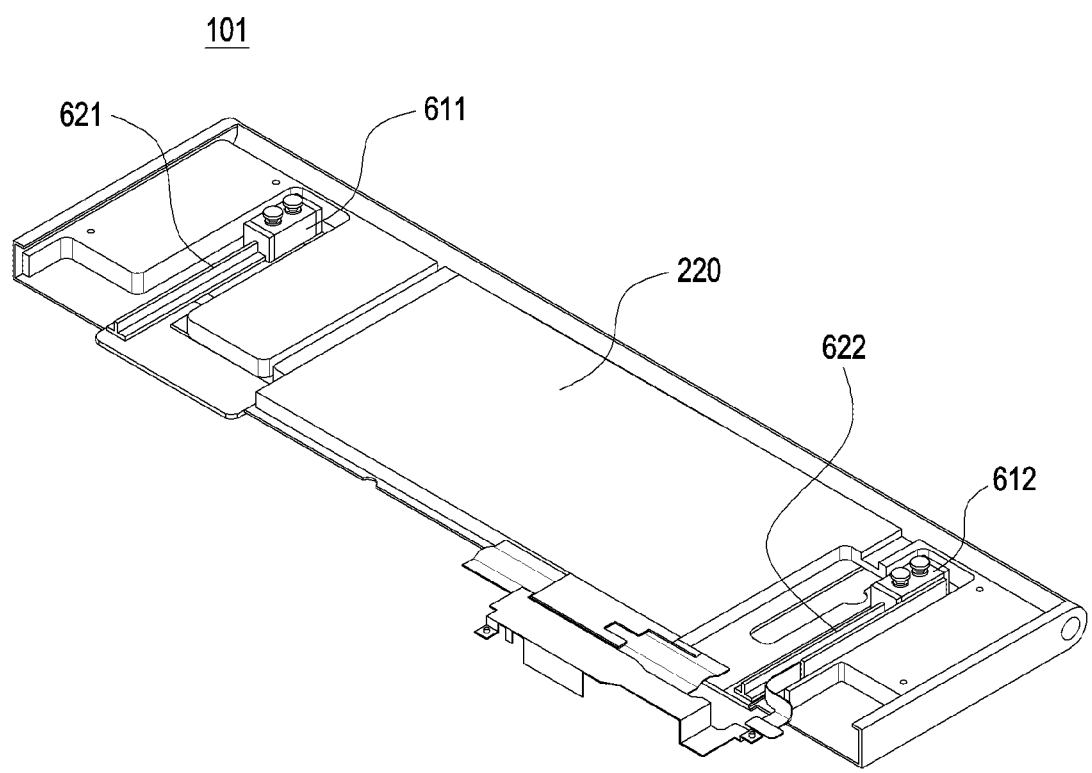
FIGS. 14 and 15 are perspective views of an electronic device including a moving block and a rail member, according to an embodiment of the disclosure.
Figure 15:
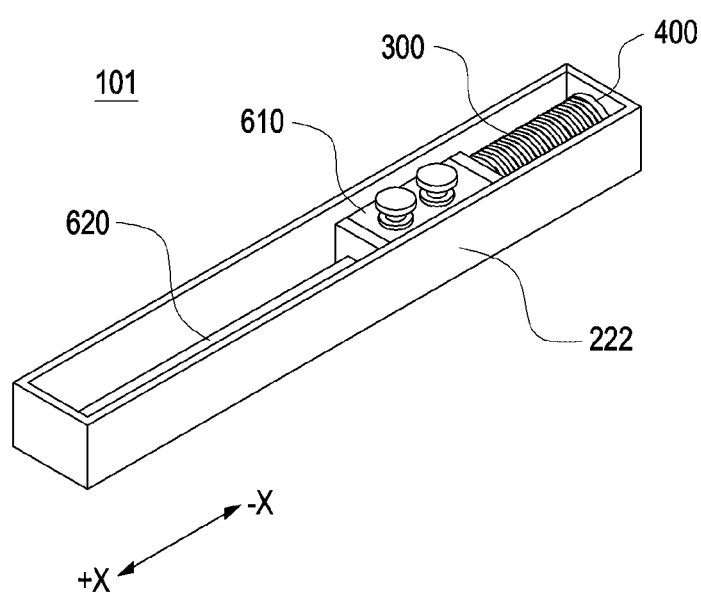

FIGS. 14 and 15 are perspective views of an electronic device including a moving block and a rail member, according to an embodiment of the disclosure.

Referring to FIGS. 14 and/or 15, the electronic device 101 may include the cover member 220, the elastic member 300, and the sensor module 400. The configuration of the cover member 220, the elastic member 300, and the sensor module 400 of FIG. 14 and/or FIG. 15 may be all or partly the same as the configuration of the cover member 220, the elastic member 300, and the sensor module 400 of FIG. 5.

According to an embodiment, the electronic device 101 may include a moving block 610 configured to compress the elastic member 300. For example, the moving block 610 may be in contact with one end portion of the elastic member 300, so as to compress the elastic member 300. According to an embodiment, the moving block 610 may be connected to a housing different from the elastic member 300. For example, the moving block 610 may be connected to the first housing 201, and the elastic member 300 may be connected to the second housing 202. The moving block 610 may face one end portion of the elastic member 300. The moving block 610 may move along a sliding direction (the X-axis direction) of the electronic device 101, based on a sliding movement of the first housing 201. According to an embodiment, the moving block 610 may move along a rail member 620. According to an embodiment, the elastic member 300 may be disposed between the moving block 610 and the sensor module 400, and compressed or tensioned based on a pressure transmitted from the moving block 610.

According to an embodiment, the moving block 610 may include a first moving block 611 which faces a first elastic member (e.g., the first elastic member 310 of FIG. 5), and a second moving block 612 which faces a second elastic member (e.g., the second elastic member 320 of FIG. 5) and is disposed substantially parallel to the first moving block 611.

According to an embodiment, the electronic device 101 may include the rail member 620 configured to guide the movement of the moving block 610 and/or the elastic member 300. For example, the moving block 610 may move along the rail member 620 in a sliding movement direction (the X-axis direction) of the electronic device 101. According to an embodiment, the rail member 620 may be connected to the cover member 222. According to an embodiment, at least a part of the rail member 620 may be surrounded by the elastic member 300. The rail member 620 may extend along a sliding direction (e.g., the X-axis direction) of the electronic device 101, and the elastic member 300 may be compressed or tensioned along the rail member 620. According to an embodiment, the rail member 620 may include a first rail member 621 configured to guide the movement of the first moving block 611 and the first elastic member 310, and a second rail member 622 configured to guide the movement of the second moving block 612 and the second elastic member 320.

According to an embodiment, the moving block 610 and the rail member 620 may be referred to as a linear guide structure (e.g., a linear motion guide (LM guide)).

An electronic device (for example, portable terminal) may include a display having a planar shape or planar and curved shapes. An electronic device including a display may have a limited display structure, thereby placing restrictions on implementing a screen larger than the size of the electronic device. There has thus been study regarding electronic devices including rollable displays.

In the case of an electronic device including a rollable display, the size of images displayed on the display or the size of the graphic display area may be changed based on the siding distance of the electronic device. Therefore, there has been study regarding a structure for reducing the sliding distance of the electronic device in order to adjust images displayed by the electronic device.

The sliding distance of the electronic device may be sensed using a magnetic field sensor (for example, Hall sensor) or capacitance sensor disposed in the electronic device. However, if the siding distance value is measured with a magnetic field sensor or inductive sensor, the accuracy of sliding distance measurement may be reduced by the magnet inside the electronic device and/or a magnetic field delivered from outside the electronic device.

The siding distance of the electronic device may be sensed using a touchscreen panel and a conductive member for providing signals to the integrated circuit of the touchscreen panel. However, use of the conductive member may accumulate stress in the display and may degrade the durability of the electronic device.

An embodiment of the disclosure may provide an electronic device capable of determining the sliding distance of the electronic device independently of external factors (for example, external magnetic fields).

Effects of the disclosure are not limited to the foregoing, and other unmentioned effects will be apparent without deviating from the idea and scope of the disclosure.

According to an embodiment of the disclosure, an electronic device may determine the sliding distance of the electronic device using an elastic member and a sensor module. The accuracy of sliding distance determination may be increased by determining the sliding distance of the electronic device based on a pressure delivered by the elastic member.

According to an embodiment of the disclosure, the electronic device 101 may include a housing (e.g., the housing 200 of FIG. 3) including a first housing (e.g., the first housing 201 of FIG. 3) and a second housing (e.g., the second housing 203 of FIG. 3) configured to receive at least a part of the first housing and guide a sliding movement of the first housing, a display (e.g., the display 203 of FIG. 3) configured to unfold based on the sliding movement of the first housing, an elastic member (e.g., the elastic member 300 of FIG. 5) disposed in the housing and configured to be compressed based on the sliding movement of the first housing, a sensor module (e.g., the sensor module 400 of FIG. 5) disposed in the housing and configured to sense a pressure provided by the elastic member, and a processor (e.g., the processor 120 of FIG. 1) configured to determine a sliding distance of the first housing, based on the pressure sensed by the sensor module.

According to an embodiment, the elastic member may include a first elastic member (e.g., the first elastic member 310 of FIG. 5) configured to be compressed when the first housing slidingly moves in a second direction, and a second elastic member (e.g., the second elastic member 320 of FIG. 5) configured to be compressed when the first housing slidingly moves in a first direction opposite to the second direction, and the sensor module may include a first sensor (e.g., the first sensor module 410 of FIG. 5) configured to sense a first pressure provided by the first elastic member, and a second sensor (e.g., the second sensor module 420 of FIG. 5) configured to sense a second pressure provided by the second elastic member.

According to an embodiment, the second housing may include an upper sidewall (e.g., the upper sidewall 224a of FIG. 5) and a lower sidewall (e.g., the lower sidewall 224b of FIG. 5) parallel to the upper sidewall, and the electronic device may include a first shaft (e.g., the first shaft 510 of FIG. 5) which is connected to the second housing at a point adjacent to the upper sidewall, and at least a part of which is surrounded by the first elastic member, and a second shaft (e.g., the second shaft 520 of FIG. 5) which is connected to the second housing at a point adjacent to the lower sidewall, and at least a part of which is surrounded by the second elastic member.

According to an embodiment, the electronic device may further include a shaft (e.g., the third shaft 530 of FIG. 7) which is connected to the second housing, at least a part of which is surrounded by the first elastic member and the second elastic member, and which is disposed between the first sensor and the second sensor.

According to an embodiment, the first housing may include a first plate (e.g., the first plate 211 of FIG. 4) configured to support at least a part of the display, and a protruding area (e.g., the protruding area 216 of FIG. 5) extending from the first plate and configured to be in contact with the elastic member.

According to an embodiment, the second housing may include a reception space (e.g., the reception spaces 225a and 225b of FIG. 5) configured to receive the elastic member and the sensor module, and an inner wall (e.g., the inner walls 226a and 226b of FIG. 5) surrounding the reception space, the sensor module may be disposed on the inner wall, and one end portion (e.g., the first end portion 310a and/or the third end portion 320a of FIG. 5) of the elastic member may face the sensor module.

According to an embodiment, the electronic device may further include a motor (e.g., the motor structure 261 of FIG. 5) disposed in the second housing, a rack gear (e.g., the rack gear 263 of FIG. 5) connected to the first housing, and a pinion gear (e.g., the pinion gear 262 of FIG. 5) connected to the motor structure and configured to engage with the rack gear.

According to an embodiment, the processor may be configured to change a size of an image output from the display, based on the pressure.

According to an embodiment, the electronic device may further include a memory (e.g., the memory 130 of FIG. 1) configured to store sliding distance information corresponding to the pressure, and the processor may be configured to determine a sliding distance of the first housing, based on the sliding distance information.

According to an embodiment, the electronic device may further include at least one magnetic body (not shown) disposed in the housing, the sensor module may include at least one magnetic sensor configured to sense the magnetic body, the processor may be configured to determine a pressure in a first state (e.g., FIG. 3) in which the electronic device is fully opened or in a second state (e.g., FIG. 2) in which the electronic device is fully closed, based on the magnetic sensor, and the processor may be configured to determine an elastic modulus for determining the sliding distance corresponding to the pressure, based on at least one of the pressure in the first state or in the second state.

According to an embodiment, the electronic device may further include at least one shaft (e.g., the shaft 500 of FIG. 5) connected to the second housing and configured to guide the movement of the elastic member.

According to an embodiment, the display may include a first display area (e.g., the first display area A1 of FIG. 3) disposed on the second housing, and a second display area (e.g., the second display area A2 of FIG. 3) extending from the first display area and configured to be visually exposed to the outside of the electronic device, based on a sliding movement of the first housing.

According to an embodiment, the processor may be configured to determine a sliding distance of the first housing, based on a first pressure (e.g., the first pressure P1 of FIG. 12) sensed by a first sensor (e.g., the first sensor module 410 of FIG. 5 or 7) in a first section (e.g., the first section I1 of FIG. 12), and to determine the sliding distance of the electronic device, based on a second pressure (e.g., the second pressure P2 of FIG. 12) sensed by a second sensor (e.g., the second sensor module 420 of FIG. 5 or 7) in a second section (e.g., the second section 12 of FIG. 12) different from the first section.

According to an embodiment, the electronic device may further include a moving block (e.g., the moving block 610 of FIG. 15) configured to compress the elastic member, and a rail (e.g., the rail member 620 of FIG. 15) which is configured to guide the movement of the moving block and at least a part of which is surrounded by the elastic member.

According to an embodiment of the disclosure, an electronic device (e.g., the electronic device 101 of FIG. 2) may include a housing (e.g., the housing 200 of FIG. 2) including a first housing (e.g., the first housing 201 of FIG. 2) and a second housing (e.g., the second housing 202 of FIG. 2) configured to receive at least a part of the first housing and guide a sliding movement of the first housing, a display (e.g., the display 203 of FIG. 2) configured to unfold based on the sliding movement of the first housing, a first elastic member (e.g., the first elastic member 310 of FIG. 5) connected to the second housing and configured to increase compressive strength when the first housing slidingly moves in a second direction (e.g., the −X direction of FIG. 5), a second elastic member (e.g., the second elastic member 320 of FIG. 5) connected to the second housing and configured to increase compressive strength when the first housing moves in a first direction (e.g., the second elastic member 320 of FIG. 5) opposite to the second direction, a first sensor module (e.g., the first sensor module 410 of FIG. 5) configured to sense a first pressure provided by the first elastic member, a second sensor module (e.g., the second sensor module 420 of FIG.

5) configured to sense a second pressure provided by the second elastic member, and a processor (e.g., the processor 120 of FIG. 1) configured to determine a sliding distance of the first housing, based on the first pressure or the second pressure.

According to an embodiment, the processor may be configured to change a size of an image output from the display, based on the pressure.

According to an embodiment, the first housing may include a first plate (e.g., the first plate 211 of FIG. 4) configured to support at least a part of the display, a first protruding area (e.g., the first protruding area 216a of FIG. 5) extending from the first plate and configured to in contact with the first elastic member, and a second protruding area (e.g., the second protruding area 216b of FIG. 5) extending from the first plate and configured to be in contact with the second elastic member.

According to an embodiment, the second housing may include an upper sidewall (e.g., the upper sidewall 224a of FIG. 5) and a lower sidewall (e.g., the lower sidewall 224b of FIG. 5) parallel to the upper sidewall, and the electronic device may further include a first shaft (e.g., the first shaft 510 of FIG. 5) which is connected to the second housing at a point adjacent to the upper sidewall, and at least a part of which is surrounded by the first elastic member, and a second shaft (e.g., the second shaft 520 of FIG. 5) which is connected to the second housing at a point adjacent to the lower sidewall, and at least a part of which is surrounded by the second elastic member.

According to an embodiment of the disclosure, an operation method of a rollable electronic device (e.g., the operation method 1000 of the electronic device of FIG. 11) may include sensing a pressure provided by an elastic member (e.g., the elastic member 300 of FIG. 5) configured to be compressed based on a sliding movement of the electronic device by using a sensor module (e.g., the sensor module 400 of FIG. 5) (e.g., the operation 1010 of FIG. 11), determining a sliding distance of the electronic device, based on the pressure (e.g., the operation 1020 of FIG. 11), and adjusting a size of an image output from a display (e.g., the display 203 of FIG. 3), based on the sliding distance (e.g., the operation 1030 of FIG. 11).

While the disclosure has been illustrated and described with reference to various example embodiments, it will be understood that the various example embodiments are intended to be illustrative, not limiting. It will be further understood by those skilled in the art that various changes in form and detail may be made without departing from the full scope of the disclosure, including the appended claims and their equivalents. It will also be understood that any of the embodiment(s) described herein may be used in conjunction with any other embodiment(s) described herein.

What is claimed is:

1. An electronic device comprising:
a housing comprising a first housing, and a second housing configured to receive at least a part of the first housing and guide a sliding movement of the first housing;
a display configured to unfold based on the sliding movement of the first housing;
an elastic member, comprising an elastic material, disposed in the housing and configured to be compressed based on the sliding movement of the first housing and which comprises a first elastic member configured to be compressed when the first housing slidingly moves in a second direction, and which is compressed when the electronic device is closed, and a second elastic member configured to be compressed when the first housing slidingly moves in a first direction opposite to the second direction, and which is compressed when the electronic device is opened;
a sensor module disposed in the housing and configured to sense a pressure provided by the elastic member and which comprises a first sensor configured to sense a first pressure provided by the first elastic member, and a second sensor configured to sense a second pressure provided by the second elastic member; and
a processor, comprising processing circuitry, configured to determine a sliding distance of the first housing, based on the pressure sensed by the sensor module.

2. The electronic device of claim 1, wherein the first housing comprises a first plate configured to support at least a part of the display, and a protruding area extending from the first plate and configured to be in contact with the elastic member.

3. The electronic device of claim 2, wherein the second housing comprises a reception space configured to receive the elastic member and the sensor module, and an inner wall configured to surround the reception space, and
the sensor module is disposed on the inner wall, and one end portion of the elastic member faces the sensor module.

4. The electronic device of claim 1, further comprising:
a motor disposed in the second housing;
a rack gear connected to the first housing; and
a pinion gear connected to the motor and configured to engage with the rack gear.

5. The electronic device of claim 1, wherein the processor is configured to change a size of an image output from the display, based on the pressure.

6. The electronic device of claim 1, further comprising:
memory configured to store sliding distance information corresponding to the pressure,
wherein the processor is configured to determine a sliding distance of the electronic device, based on the sliding distance information.

7. The electronic device of claim 1, further comprising:
at least one magnetic body disposed in the housing,
wherein the sensor module comprises at least one magnetic sensor configured to sense the magnetic body,
the processor is configured to determine a pressure in a first state in which the electronic device is fully opened or in a second state in which the electronic device is fully closed, based on the magnetic sensor, and
the processor is configured to determine an elastic modulus for determining the sliding distance corresponding to the pressure, based on at least one of the pressure in the first state or in the second state.

8. The electronic device of claim 1, further comprising:
at least one shaft connected to the second housing and configured to guide a movement of the elastic member.

9. The electronic device of claim 1, wherein the second housing comprises an upper sidewall and a lower sidewall parallel to the upper sidewall, and the electronic device further comprises a first shaft which is connected to the second housing at a point adjacent to the upper sidewall, and at least a part of which is surrounded by the first elastic member, and
a second shaft which is connected to the second housing at a point adjacent to the lower sidewall, and at least a part of which is surrounded by the second elastic member.

10. The electronic device of claim 1, further comprising:
a shaft which is connected to the second housing, at least a part of which is surrounded by the first elastic member and the second elastic member, and which is disposed between the first sensor and the second sensor.

11. The electronic device of claim 1, wherein at least a part of the first elastic member or at least a part of the second elastic member is compressed.

12. The electronic device of claim 1, wherein the display comprises a first display area disposed on the second housing, and a second display area extending from the first display area and configured to be visually exposed to an outside of the electronic device, based on the sliding movement of the first housing.

13. The electronic device of claim 1, wherein the processor is configured to determine a sliding distance of the first housing, based on a first pressure sensed by a first sensor in a first section, and to determine the sliding distance of the first housing, based on a second pressure sensed by a second sensor in a second section different from the first section.

14. The electronic device of claim 1, further comprising:
a moving block configured to compress the elastic member; and
a rail which is configured to guide a movement of the moving block and at least a part of which is surrounded by the elastic member.

15. An electronic device comprising:
a housing comprising a first housing and a second housing configured to receive at least a part of the first housing and guide a sliding movement of the first housing;
a display configured to unfold based on the sliding movement of the first housing;
a first elastic member, comprising an elastic material, connected to the second housing and configured to increase compressive strength when the first housing slidingly moves in a second direction and which is compressed when the electronic device is closed;
a second elastic member, comprising an elastic material, connected to the second housing and configured to increase compressive strength when the first housing moves in a first direction opposite to the second direction and which is compressed when the electronic device is opened;
a first sensor configured to sense a first pressure provided by the first elastic member;
a second sensor configured to sense a second pressure provided by the second elastic member; and
a processor, comprising processing circuitry, configured to determine a sliding distance of the first housing, based on the first pressure or the second pressure.

16. The electronic device of claim 15, wherein the processor is configured to change a size of an image output from the display, based on the first pressure or the second pressure.

17. The electronic device of claim 15, wherein the first housing comprises a first plate supporting at least a part of the display, a first protruding area extending from the first plate and configured to be in contact with the first elastic member, and a second protruding area extending from the first plate and configured to be in contact with the second elastic member.

18. The electronic device of claim 15, wherein the second housing comprises an upper sidewall and a lower sidewall parallel to the upper sidewall, and
the electronic device further comprises a first shaft which is connected to the second housing at a point adjacent to the upper sidewall, and at least a part of which is surrounded by the first elastic member, and
a second shaft which is connected to the second housing at a point adjacent to the lower sidewall, and at least a part of which is surrounded by the second elastic member.

19. An operation method of a rollable electronic device, the method comprising:
sensing a pressure provided by a first elastic member configured to be compressed based on a sliding movement of the electronic device when it is closed by using a first sensor module;
sensing a pressure provided by a second elastic member configured to be compressed based on a sliding movement of the electronic device when it is opened by using a second sensor module;
determining a sliding distance of the electronic device, based on the pressure; and
adjusting a size of an image output from a display, based on the sliding distance.

* * * * *